United States Patent
Maeda et al.

(10) Patent No.: US 7,403,468 B2
(45) Date of Patent: Jul. 22, 2008

(54) RECORDING MEDIUM HAVING POSITION RECOGNITION STRUCTURE, AND POSITION RECOGNITION APPARATUS AND METHOD

(75) Inventors: Takanori Maeda, Saitama (JP); Atsushi Onoe, Saitama (JP)

(73) Assignee: Pioneer Corp., Tokyo (JP)

( * ) Notice: Subject to any disclaimer, the term of this patent is extended or adjusted under 35 U.S.C. 154(b) by 571 days.

(21) Appl. No.: 10/933,493

(22) Filed: Sep. 3, 2004

(65) Prior Publication Data
US 2005/0047288 A1 Mar. 3, 2005

(30) Foreign Application Priority Data
Sep. 3, 2003 (JP) ............... 2003-311881

(51) Int. Cl.
*G11B 7/00* (2006.01)
(52) U.S. Cl. .................................... 369/126
(58) Field of Classification Search ............ None
See application file for complete search history.

(56) References Cited

U.S. PATENT DOCUMENTS

| | | | |
|---|---|---|---|
| 5,012,363 A | 4/1991 | Mine et al. | |
| 5,270,990 A | 12/1993 | Mizasawa et al. | |
| 5,394,388 A | 2/1995 | Hatanaka et al. | |
| 5,425,012 A * | 6/1995 | Hayashi | 369/120 |
| 5,490,132 A | 2/1996 | Yagi et al. | |
| 5,526,334 A | 6/1996 | Yamano et al. | |
| 5,757,760 A | 5/1998 | Shido et al. | |
| 5,963,513 A * | 10/1999 | Lemelson | 369/14 |
| 6,195,313 B1 | 2/2001 | Seki et al. | |
| 6,249,503 B1 * | 6/2001 | Aratani | 369/126 |
| 6,314,019 B1 * | 11/2001 | Kuekes et al. | 365/151 |
| 6,735,163 B2 * | 5/2004 | Marshall | 369/126 |
| 6,937,500 B2 * | 8/2005 | Gudesen et al. | 365/145 |
| 2002/0067634 A1 | 6/2002 | Gibson | |
| 2003/0016613 A1 | 1/2003 | Raese | |
| 2003/0081532 A1 | 5/2003 | Gibson | |
| 2003/0185140 A1 | 10/2003 | Ives | |
| 2004/0042373 A1 | 3/2004 | Gibson et al. | |
| 2004/0085883 A1 | 5/2004 | Raese | |
| 2004/0105373 A1 | 6/2004 | Maeda et al. | |
| 2005/0047288 A1 | 3/2005 | Maeda et al. | |
| 2005/0099895 A1 | 5/2005 | Maeda et al. | |
| 2006/0182004 A1 | 8/2006 | Maeda et al. | |
| 2006/0245312 A1 | 11/2006 | Maeda et al. | |

FOREIGN PATENT DOCUMENTS

| | | |
|---|---|---|
| EP | 0 327 207 | 8/1989 |
| EP | 1 211 680 A2 | 6/2002 |
| EP | 1 310 954 A2 | 5/2003 |
| EP | 1 398 781 A2 | 3/2004 |
| GB | 2 387 018 A | 10/2003 |
| JP | 61-113175 | 5/1986 |
| JP | 4-090151 | 3/1992 |
| JP | 2003-346392 | 12/2003 |

* cited by examiner

*Primary Examiner*—Joseph Feild
*Assistant Examiner*—Peter Vincent Agustin
(74) *Attorney, Agent, or Firm*—Nixon & Vanderhye, PC

(57) ABSTRACT

Position information is formed on a recording surface of a recording medium. The position information is constructed from first line segments, which are parallel to each other, and a second line segment, which crosses the first line segments. On the basis of a distance between (i) an intersection of one of the first line segment and a scan line and (ii) an intersection of another of the first line segments and the scan line, the intersection and an intersection of the second line segment and the scan line are measured or calculated. By this, a position of a head is recognized.

26 Claims, 13 Drawing Sheets

RECORDING MEDIUM HAVING POSITION RECOGNITION STRUCTURE, AND POSITION RECOGNITION APPARATUS AND METHOD

BACKGROUND OF THE INVENTION

1. Field of the Invention

The present invention relates to a recording medium having a recording surface to record information thereon and having a position recognition structure for recognizing a position on the recording surface, a position recognition apparatus for recognizing the position on the recording surface, and a position recognition method.

2. Description of the Related Art

As large-capacity recording media used for various apparatuses, such as a computer, a player and a recorder for music and video or the like, and a car navigation apparatus, there are a compact disc, a DVD, a hard disc and the like. With respect to any one of the recording media, it is possible to record a huge amount of information onto a recording surface formed on the disc at high density.

In such large-capacity recording media, it is required to accurately recognize a recording position of the information on the recording surface. It is also required to set a rule about the recording position and arrangement of the information, and it is required to record and read the information highly accurately according to the rule.

In response to the requirement, for example, in a currently used DVD-RAM, a land-groove method is adopted as its recording method. Namely, on the recording surface, grooves are formed in the circumferential direction. The information is recorded onto the grooves and onto the lands (i.e. a place between the grooves). By this, the information is defined by the grooves, and arranged and recorded in the circumferential direction of the disc. The lines of the information arranged in the circumferential direction of the disc in this manner correspond to tracks. Moreover, each track is divided at predetermined intervals in the circumferential direction of the disc. The divisional small areas correspond to sectors. In each of the sectors, address pits having a bumpy shape are formed. Moreover, a wobble having a predetermined cycle is formed on the groove, which is formed on the recording surface, and on the basis of the cycle of the wobble, it is possible to estimate a position of the address pit.

In the DVD-RAM having the recording method as described above, it is possible to accurately recognize the record position of the information, and it is possible to record and read the information highly accurately. This is because the groove formed on the recording surface is an absolute (or immovable) standard for the position recognition.

SUMMARY OF THE INVENTION

Recently, the following method has been developed: i.e., a method of recording the information onto the recording medium by using a sub-micro-scale or nano-scale cantilever or probe or the like. Such a recording method includes: a method of recording the information by using spontaneous polarization of a ferroelectric substance; a method of recording the information by making a hole on a polymer film with heat; a method of recording the information by using charge accumulation of a laminated material, which is provided with an silicon oxide film and/or a silicon nitride film, etc., or the like. Moreover, a method of reproducing the information recorded on the recording medium by the recording method has been also developed. Such a reproducing method includes: a method of using a technique of Scanning Nonlinear Dielectric Microscopy (SNDM), a method of using a technique of Scanning Maxwell-stress Microscopy, a method of using a technique of Kelvin Force Microscopy, a method of using a technique of Scanning Capacitance Microscopy, or the like.

According to the recording method and the reproducing method, it is possible to record the information onto the recording medium at super high density, and read and reproduce the recorded information at high resolution. The recording density or reading resolution is beyond the limitation of magnetic recording and optical recording. For example, a track pitch of the DVD-RAM is 0.74 μm, but according to the information recording/reproducing method by using the prove or the like, it is possible to reduce the track pitch to 30 nm or less, for example.

However, if the recording density increases, the track pitch decreases. As a result, it is difficult to form the groove in association with the track on the recording surface of the recording medium. If there is not any groove on the recording surface, it is extremely difficult to accurately recognize the recording position of the information as there is no absolute (or immovable) standard to recognize the recording position of the information.

Even if there is not any groove, the following method is also conceivable: i.e., a method of forming the address pits or sector marks at predetermined intervals on the recording surface, to thereby recognize the recording position of the information on the basis of the address pits or sector marks. However, if the recording density is a super high density, it is difficult even to form the address pits or sector marks at predetermined intervals without any standard. Like the groove in the DVD-RAM, it is desirable to form a clear and absolute standard on the recording surface of the recording medium.

Moreover, the following position recognition method is also conceivable: i.e., a method of recognizing the recording position of the information by a positioning mechanism for supporting the recording medium itself, such as a stage, or by a positioning mechanism for recording the information, such as a head, without depending on a physical mark or a locus formed on the recording surface of the recording medium, such as the groove. However, it is unrealistic to realize the highly accurate nano-scale position recognition by the supporting structure of the recording medium and by the positioning mechanism of the head. For example, if the position of the recording medium mounted on the stage is misaligned even slightly, then, it is no longer capable of accurately recognizing the recording position of the information. Again, it is desirable that there is the absolute (or immovable) standard on the recording surface of the recording medium.

Moreover, in the case of a disc-shaped recording medium, such as the DVD-RAM, even if the recording density of the information increases, it may not be impossible to form the grooves onto the recording surface if the accuracy is relaxed to some extent. This is because in the case of the disc-shaped recording medium, once its rotational axis is determined, it is relatively easy to form the grooves, which are spiral-shaped, onto the recording surface. However, in the case of the recording medium in which the information is scheduled to be arranged and recorded in a matrix form on the recording surface, it is required to form the tracks to extend on straight lines in its X axis direction or Y axis direction. In this case, it is extremely difficult to form the grooves which extend on straight lines in the X axis direction or Y axis direction, as compared to the case of forming the spiral groove.

On the other hand, if the grooves can be formed at extremely small intervals onto the recording surface, it takes a long time to form the grooves because the number of grooves is huge. As a result, it takes a long time to produce or manufacture the recording medium or format the recording medium. This is disadvantageous.

Furthermore, if the grooves can be formed at extremely small intervals onto the recording surface, as a result of this, the directions of the tracks are determined from these grooves. Thus, in mounting the recording medium onto a recording apparatus, even slight position misalignment is not allowed between the recording medium and a probe head of the recording apparatus. This is because it is difficult to perform accurate tracking if the positions of the recording medium and the probe head of the recording apparatus are misaligned even slightly, as the directions of a huge number of tracks are determined in advance in the extremely small track pitches. This is a big hindrance to the design and production of the recording apparatus.

It is therefore a first object of the present invention to provide a recording medium having a position recognition structure capable of accurately recognizing the position of the information on the recording surface even if the recording density of the information increases, as well as a position recognition apparatus and a position recognition method.

It is a second object of the present invention to provide a recording medium having a position recognition structure capable of reducing a format time length for the recording medium even if the recording density of the information increases, as well as a position recognition apparatus and a position recognition method.

It is a third object of the present invention to provide a recording medium having a position recognition structure capable of accurately recognizing the position of the information on the recording surface even if there is misalignment between the recording medium and the head of a recording apparatus, as well as a position recognition apparatus and a position recognition method.

The above objects of the present invention can be achieved by a first recording medium used for an information recording or reading apparatus, provided with: a recording surface to record thereon information; and position information, which is formed on the recording surface, for recognizing a position on the recording surface, the position information including: at least two first line segments, which are parallel to each other, formed by giving physical features which are different from those of other part on the recording surface; and at least one second line segment formed by giving physical features which are different from those of other part on the recording surface, the first line segments and the second line segment being disposed such that at least one of the first line segments or an extension line of at least one of the first line segments crosses the second line segment or an extension line of the second line segment.

The above objects of the present invention can be also achieved by a second recording medium used for an information recording or reading apparatus, provided with: a recording surface to record thereon information; and position information, which is formed on the recording surface, for recognizing a position on the recording surface, the position information including: at least two first line segments, which are parallel to each other, formed by giving physical features which are different from those of other part on the recording surface; and at least two second line segments, which are parallel to each other, formed by giving physical features which are different from those of other part on the recording surface, the first line segments and the second line segments being disposed such that at least one of the first line segments or an extension line of at least one of the first line segments crosses at least one of the second line segments or an extension line of at least one of the second line segments.

The above objects of the present invention can be also achieved by a first position recognition apparatus for recognizing a position on a recording surface of a recording medium provided with: at least two first line segments, which are parallel to each other, formed by giving physical features which are different from those of other part on the recording surface; and at least one second line segment formed by giving physical features which are different from those of other part on the recording surface, the first line segments and the second line segment being disposed such that at least one of the first line segments or an extension line of at least one of the first line segments crosses the second line segment or an extension line of the second line segment, the position recognition apparatus provided with: a detecting device for scanning on a scan line, which crosses the first line segments and the second line segment, to thereby detect an intersection of one of the first line segments and the scan line, an intersection of another of the first line segments and the scan line, and an intersection of the second line segment and the scan line; a first distance recognition device for recognizing a distance between (i) the intersection of one of the first line segments and the scan line and (ii) the intersection of another of the first line segments and the scan line, on the basis of a detection result of the detecting device; a second distance recognition device for recognizing a distance between (i) the intersection of one or another of the first line segments and the scan line and (ii) the intersection of the second line segment and the scan line, on the basis of the detection result of the detecting device; and a comparing device for comparing the distance recognized by the first distance recognition device with the distance recognized by the second distance recognition device.

The above objects of the present invention can be also achieved by a second position recognition apparatus for recognizing a position on a recording surface of a recording medium provided with: at least two first line segments, which are parallel to each other, formed by giving physical features which are different from those of other part on the recording surface; and at least two second line segments, which are parallel to each other, formed by giving physical features which are different from those of other part on the recording surface, the first line segments and the second line segments being disposed such that at least one of the first line segments or an extension line of at least one of the first line segments crosses at least one of the second line segments or an extension line of at least one of the second line segments, the position recognition apparatus provided with: a detecting device for scanning on a scan line, which crosses the first line segments and the second line segments, to thereby detect an intersection of one of the first line segments and the scan line, an intersection of another of the first line segments and the scan line, an intersection of one of the second line segments and the scan line, and an intersection of another of the second line segments and the scan line; a first distance recognition device for recognizing a distance between (i) the intersection of one of the first line segments and the scan line and (ii) the intersection of another of the first line segments and the scan line, on the basis of a detection result of the detecting device; a second distance recognition device for recognizing a distance between (i) the intersection of one of the second line segments and the scan line and (ii) the intersection of another of the second line segments and the scan line, on the basis of the detection result of the detecting device; a third distance recognition device for recognizing a distance between (i) the intersection of one or another of the first line segments and the scan line and (ii) the intersection of one or another of the second line segments and the scan line, on the basis of the detection result of the detecting device; and a comparison-operating device of performing comparison operation by using the distance recognized by the first distance recognition device, the distance recognized by the second distance recognition device, and the distance recognized by the third distance recognition device.

The above objects of the present invention can be also achieved by a first position recognition method of recognizing a position on a recording surface of a recording medium provided with: at least two first line segments, which are parallel to each other, formed by giving physical features which are different from those of other part on the recording surface; and at least one second line segment formed by giving physical features which are different from those of other part on the recording surface, the first line segments and the second line segment being disposed such that at least one of the first line segments or an extension line of at least one of the first line segments crosses the second line segment or an extension line of the second line segment, the position recognition method provided with: a detecting process of scanning on a scan line, which crosses the first line segments and the second line segment, to thereby detect an intersection of one of the first line segments and the scan line, an intersection of another of the first line segments and the scan line, and an intersection of the second line segment and the scan line; a first distance recognition process of recognizing a distance between (i) the intersection of one of the first line segments and the scan line and (ii) the intersection of another of the first line segments and the scan line, on the basis of a detection result of the detecting process; a second distance recognition process of recognizing a distance between (i) the intersection of one or another of the first line segments and the scan line and (ii) the intersection of the second line segment and the scan line, on the basis of the detection result of the detecting process; and a comparing process of comparing the distance recognized by the first distance recognition process with the distance recognized by the second distance recognition process.

The above objects of the present invention can be also achieved by a second position recognition method of recognizing a position on a recording surface of a recording medium provided with: at least two first line segments, which are parallel to each other, formed by giving physical features which are different from those of other part on the recording surface; and at least two second line segments, which are parallel to each other, formed by giving physical features which are different from those of other part on the recording surface, the first line segments and the second line segments being disposed such that at least one of the first line segments or an extension line of at least one of the first line segments crosses at least one of the second line segments or an extension line of at least one of the second line segments, the position recognition method provided with: a detecting process of scanning on a scan line, which crosses the first line segments and the second line segments, to thereby detect an intersection of one of the first line segments and the scan line, an intersection of another of the first line segments and the scan line, an intersection of one of the second line segments and the scan line, and an intersection of another of the second line segments and the scan line; a first distance recognition process of recognizing a distance between (i) the intersection of one of the first line segments and the scan line and (ii) the intersection of another of the first line segments and the scan line, on the basis of a detection result of the detecting process; a second distance recognition process of recognizing a distance between (i) the intersection of one of the second line segments and the scan line and (ii) the intersection of another of the second line segments and the scan line, on the basis of the detection result of the detecting process; a third distance recognition process of recognizing a distance between (i) the intersection of one or another of the first line segments and the scan line and (ii) the intersection of one or another of the second line segments and the scan line, on the basis of the detection result of the detecting process; and a comparison-operating process of performing comparison operation by using the distance recognized by the first distance recognition process, the distance recognized by the second distance recognition process, and the distance recognized by the third distance recognition process.

The nature, utility, and further features of this invention will be more clearly apparent from the following detailed description with reference to preferred embodiment of the invention when read in conjunction with the accompanying drawings briefly described below.

DETAILED DESCRIPTION OF THE PREFERRED EMBODIMENTS

Embodiments of the present invention will be hereinafter explained with reference to the drawings.

First Embodiment of Recording Medium

The first embodiment of the recording medium of the present invention will be explained. Incidentally, the drawings, which are used in the detailed description of the preferred embodiments, embody constitutional elements or the like of the embodiments of the present invention, only for the purpose of explaining technical ideas thereof. The shape, size, position, connection relationship, and the like of various constitutional elements or the like are not limited to these drawings.

Figure 1:
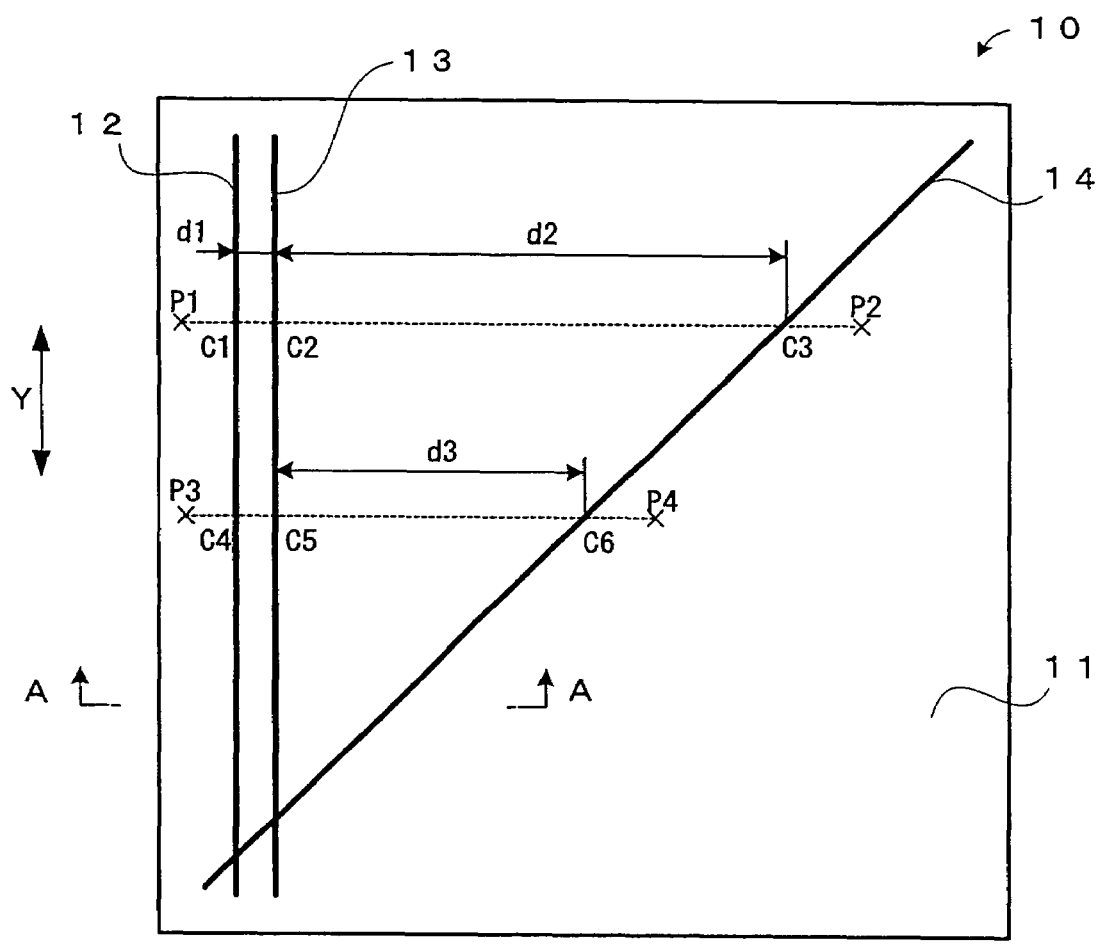
FIG. 1 is a plan view showing a first embodiment of a recording medium of the present invention.

FIG. 1 shows the first embodiment of the recording medium of the present invention. A recording medium 10 shown in FIG. 1 is used for an apparatus for recording or reading information. This information includes a computer program, an operating system program, application software, text data, audio data, video data, control data for record and reproduction operations, or the like. The recording medium 10 can be used as a storage device for various apparatuses, such as a computer, an audio apparatus, a control apparatus for an automobile and an airplane, a medical apparatus, and a robot.

Various information recording methods can be adopted to the recording medium 10. For example, the following methods can be adopted: the method of recording the information by using spontaneous polarization of a ferroelectric substance (hereinafter referred to as a "ferroelectric recording method"); the method of recording the information by making a hole on a polymer film with heat (hereinafter referred to as a "thermomechanical recording method"); a method of recording the information by using a phase change (hereinafter referred to as a "phase change recording method"); a method of recording the information by using magnetism (hereinafter referred to as a "magnetic recording method"); a method of recording the information by using near-field light (hereinafter referred to as a "near-field light recording method"); or the like.

A material used for a recording layer of the recording medium 10 can be selected according to the information recording method, as occasion demands. For example, in the case of the ferroelectric recording method, a ferroelectric material, such as lithium tantalite (LiTaO3) is desirably used for the formation of the recording layer of the recording medium 10. In the case of the thermomechanical recording method, a polymer material, such as polymethylmethacrylate (PMMA) is desirably used for the recording layer of the recording medium 10. In the case of the phase change recording method, a phase-change material is desirably used for the recording layer of the recording medium 10. In the case of the magnetic recording method, a magnetic material is desirably used for the recording layer of the recording medium 10. The shape of the recording medium 10 is not limited, except having a recording surface 11 which is a plane surface. The overall size of the recording medium 10 is not limited, either.

As shown in FIG. 1, the recording medium 10 has the recording surface 11. The recording surface 11 is a surface to record the information thereon. The recoding surface 11 includes not only an area to mainly record therein contents data, such as the audio data and the video data, but also an area to mainly record therein the control data. For example, in the case of the DVD, the recording surface 11 also includes an area which plays a similar role as a lead-in area and a lead-out area. Moreover, the recording surface 11 may include not only an area which can be usually accessed by the head of a recoding apparatus, but also an area which cannot be accessed by the head of the recording apparatus. For example, in the case of the DVD, the recording surface 11 may also include an area placed on the inner circumferential side of the lead-in area.

On the recording surface 11, position information for recognizing a position on the recording surface 11 is recorded. The position information includes first line segments 12/13, and a second line segment 14, as shown in FIG. 1.

The first line segments 12 and 13 are formed by giving physical features which are different from those of the other part (portion) on the recording surface 11. The number of the first line segments is two. Incidentally, the number of the first line segments shown in FIG. 1 is just one example. The number of the first line segments may be equal to or greater than two.

The first line segments 12 and 13 are disposed parallel to each other. The first line segments 12 and 13 are disposed to be adjacent to each other. Incidentally, the first line segments 12 and 13 are not necessarily adjacent to each other. If the first line segments 12 and 13 are disposed in the vicinity of each other, there may be another line segment between the first line segments 12 and 13. However, if the first line segments 12 and 13 are adjacent each other and there is no line segment between the first line segment 12 and 13, it is easy to recognize a distance between (i) an intersection of one of the first line segments (e.g. the first line segment 12) and a scan line and (ii) an intersection of another of the first line segments (e.g. the first line segment 13) and the scan line (refer to a description about the principle of position recognition described later).

With respect to the first line segments 12 and 13, their upper ends are placed in the vicinity of the upper end of the recording surface 11, and their lower ends are placed in the vicinity of the lower end of the recording surface 11. The first line segments 12 and 13 extend straight from the vicinity of the upper end to the vicinity of the lower end of the recording surface 11. Incidentally, the positions of the end portions of the first line segments 12/13 and the lengths thereof are not limited to this example. However, in order to recognize an arbitrary position on the recording surface 11, it is desirable that the first line segments have lengths substantially running across the recording surface. The widths of the first line segments 12 and 13 are not specially limited if having the widths which can be read by the recording apparatus.

The second line segment 14 is formed by giving physical features which are different from those of the other part on the recording surface 11. The number of the second line segment is one. Incidentally, the number of the second line segment shown in FIG. 1 is just one example. The number of the second line segment may be plural.

With respect to the second line segment 14, its upper end is placed in the vicinity of the upper right end of the recording surface 11, and its lower end is placed in the vicinity of the lower left end of the recording surface 11. The second line segment 14 extends straight from the vicinity of the upper right end to the vicinity of the lower left end of the recording surface 11. Incidentally, the positions of the end portions of the second line segment 14 and the length thereof are not limited to this example. However, in order to recognize an arbitrary position on the recording surface, it is desirable that the second line segment has a length substantially running across the recording surface 11. The width of the second line segment 14 is not specially limited if having the width which can be read by the recording apparatus.

The first line segments 12/13 and the second line segment 14 are disposed to cross each other on the recording surface 11. More specifically, the second line segment 14 crosses both the first line segments 12/13 in the vicinity of the lower left end of the recoding surface 11. An angle at which (i) each of the first line segments 12/13 and (ii) the second line segment 14 cross is 45 degrees. Incidentally, it is not necessary to dispose the first line segments 12/13 and the second line segment 14 to cross each other on the recording surface 11. Namely, the first line segments 12/13 and the second line segment 14 may be disposed such that at least one of the first line segments 12/13 or an extension line of at least one of the first line segments 12/13 crosses the second line segment 14 or an extension line of the second line segment 14. The angle at which the first line segments 12/13 or the extension lines of the first line segments 12/13 cross the second line segment or the extension line of the second line segment is not limited, either.

The first line segments 12 and 13 are desirably at 90 degrees to a prearranged scan direction for recording or reading the information with respect to the recording surface 11 (i.e. a scan direction of the head when the recording medium has a correct position relationship with the head of the recording apparatus, e.g. a straight line between P1 and P2 in FIG. 1), as shown in FIG. 1. By this, it is possible to increase the accuracy of the position recognition on the recording surface. Moreover, the second line segment 14 is desirably at 45 degrees to the prearranged scan line, as shown in FIG. 1. By this, it is possible to increase the accuracy of the position recognition on the recording surface 11.

Figure 2:
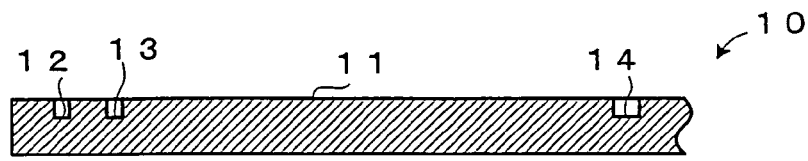
FIG. 2 is a cross sectional view showing one aspect of physical features of a line segment associated with the first embodiment of the recording medium of the present invention.

FIG. 2 is an A-A cross sectional view of the recording medium 10 in FIG. 1. As shown in FIG. 2, the first line segments 12/13 and the second line segment 14 are concave portions formed on the recording surface 11. If the recording layer of the recording medium 10 is formed by using the polymer material, such as PMMA, the first line segments 12/13 and the second line segment 14 can be formed by irradiating laser light onto the recording surface 11 and displacing it linearly. The first line segments 12/13 and the second line segment 14 are straight lines, so that it is possible to form them easily by using the laser light in this manner.

Figure 3:
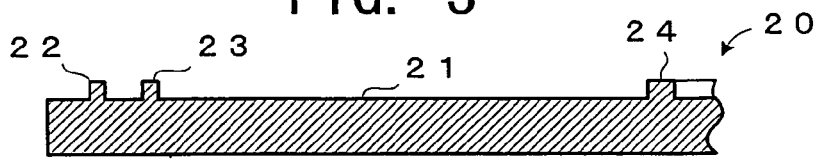
FIG. 3 is a cross sectional view showing another aspect of physical features of the line segment associated with the first embodiment of the recording medium of the present invention.
Figure 4:
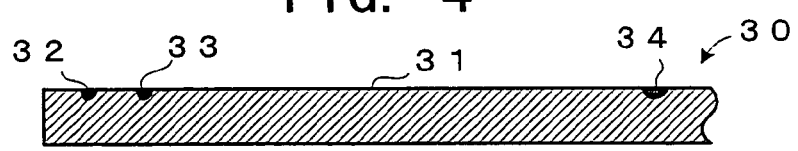
FIG. 4 is a cross sectional view showing another aspect of physical features of the line segment associated with the first embodiment of the recording medium of the present invention.
Figure 5:
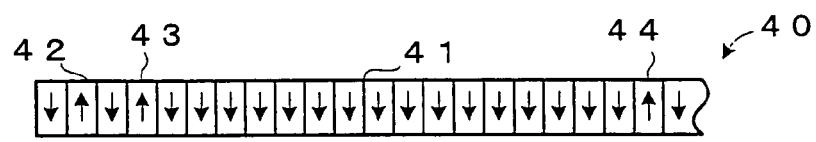
FIG. 5 is a cross sectional view showing another aspect of physical features of the line segment associated with the first embodiment of the recording medium of the present invention.

Incidentally, the first line segments 12/13 and the second line segment 14 shown in FIG. 2 are just one example. Other physical features of the first line segments 12/13 and the second line segment 14, such as the shapes of the cross sectional surfaces, are not specially limited if they are different from those of the other part on the recording surface 11. For example, like a recording medium 20 shown in FIG. 3, it is possible to form first line segments 22 and 23 and a second line segment 24 onto a recording surface 21 to have convex-shaped cross sectional surfaces. Moreover, like a recording medium 30 shown in FIG. 4, it is possible to form first line segments 32 and 33 and a second line segment 34 onto a recording surface 31 by making a crystal structure of a material, which forms the recording layer, different from those of the other part. For example, if the recoding layer is formed from the phase change material, only part corresponding to the first line segments 32 and 33 and the second line segment 34 are formed in an amorphous phase. Moreover, like a recording medium 40 shown in FIG. 5, if the recording layer is the ferroelectric material, it is possible to form first line segments 42 and 43 and a second line segment 44 onto a recording surface 41 by making a polarization direction of the ferroelectric material different from those of the other part.

Figure 6:
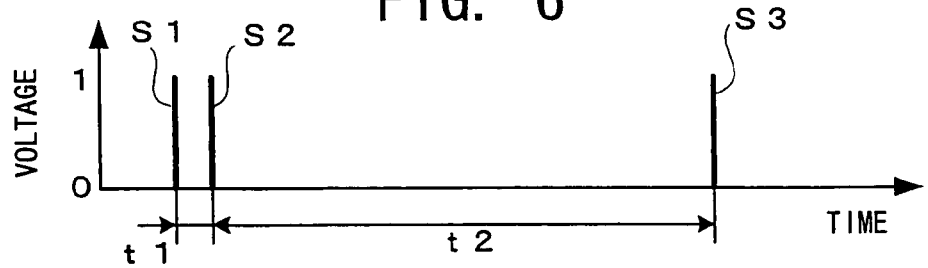
FIG. 6 is a graph showing pulse signals obtained by scanning line segments.

The principle of recognizing a position on the recording surface 11 on the basis of the first line segments 12/13 and the second line segment 14 is as follows. In FIG. 1, at first, it is assumed that the head of the recording apparatus is displaced from P1 to P2 at a predetermined speed and scans between P1 and P2. In this case, a scan line of the head crosses the first line segment 12 at an intersection C1, crosses the first line segment 13 at an intersection C2, and crosses the second line segment 14 at an intersection C3. Along with the displacement of the head, pulse signals S1, S2, and S3 as shown in FIG. 6 are obtained from the head. The pulse signal S1 is obtained when the head passes the intersection C1. The pulse signal S2 is obtained when the head passes the intersection C2. The pulse signal S3 is obtained when the head passes the intersection C3. A time length t1 between the pulse signal S1 and the pulse signal S2 corresponds to a distance d1 between the intersection C1 and the intersection C2. A time length t2 between the pulse signal S2 and the pulse signal S3 corresponds to a distance d2 between the intersection C2 and the intersection C3. Therefore, by comparing the time length t1 and the time length t2, it is possible to measure or calculate the distance d2 based on the distance d1.

Next, in FIG. 1, it is assumed that the head of the recording apparatus is displaced from P3 to P4 at a predetermined speed and scans between P3 and P4. In this case, a scan line of the head crosses the first line segment 12 at an intersection C4, crosses the first line segment 13 at an intersection C5, and crosses the second line segment 14 at an intersection C6. As a result, pulse signals, each corresponding to relative one of the intersections C4, C5, and C6, are obtained from the head. Thus, on the basis of the pulse signals, it is possible to recognize a distance between the intersections C4 and C5 and a distance between the intersections C5 and C6. Since the first line segment 12 and the first line segment 13 are parallel to each other, the distance between the intersections C4 and C5 is the same as the distance between the intersections C1 and C2, i.e. d1. However, the distance d3 between the intersections C5 and C6 is shorter than the distance d2 between the intersections C2 and C3. As a result, the distance d3 based on the distance d1 is shorter than the distance d2 based on the distance d1.

As described above, depending on a position of the head of the recording apparatus in the Y direction shown with an arrow, a distance between (i) an intersection of the first line segment 13 and a scan line and (ii) an intersection of the second line segment 14 and the scan line varies. By measuring or calculating the distance between (i) an intersection of the first line segment 13 and a scan line and (ii) an intersection of the second line segment 14 and the scan line, it is possible to recognize the position of the head in the Y direction shown with the arrow. Particularly, by using the distance d1, which is between (i) an intersection of the first line segment 12 and a scan line and (ii) an intersection of the first line segment 13 and the scan line, as a standard of measuring or calculating the distance between (i) an intersection of the first line segment 13 and a scan line and (ii) an intersection of the second line segment 14 and the scan line, the highly accurate position recognition can be performed. This is because the distance between the first line segment 12 and the first line segment 13 is the immovable standard.

Incidentally, the position of the head in the Y direction shown with the arrow can be recognized, not by measuring or calculating the distance between (i) an intersection of the first line segment 13 and a scan line and (ii) an intersection of the second line segment 14 and the scan line, but by measuring or calculating a distance between (i) an intersection of the first line segment 12 and a scan line and (ii) an intersection of the second line segment 14 and the scan line. In the example taken here, the fact that the head passes the intersections C1, C2, and C3 is detected as the pulse signals S1, S2, and S3 or the like, and the distance between the intersections is measured or calculated on the basis of the time interval between these pulse signals. However, the method of recognizing the distance between the intersections is not limited to this example. It is possible to adopt various methods, for example, a method of detecting these elements in analog quantity, or the like.

In this manner, if a position on the recording surface 11 can be recognized on the basis of the first line segments 12/13 and the second line segment 14, then it is possible to realize tracking control or detection of a recording address of the information on the basis of this position. Moreover, if a position on the recording surface 11 can be recognized on the basis of the first line segments 12/13 and the second line segment 14, by using this position as the absolute standard, it is possible to record another position information onto the recording surface 11.

Figure 7:
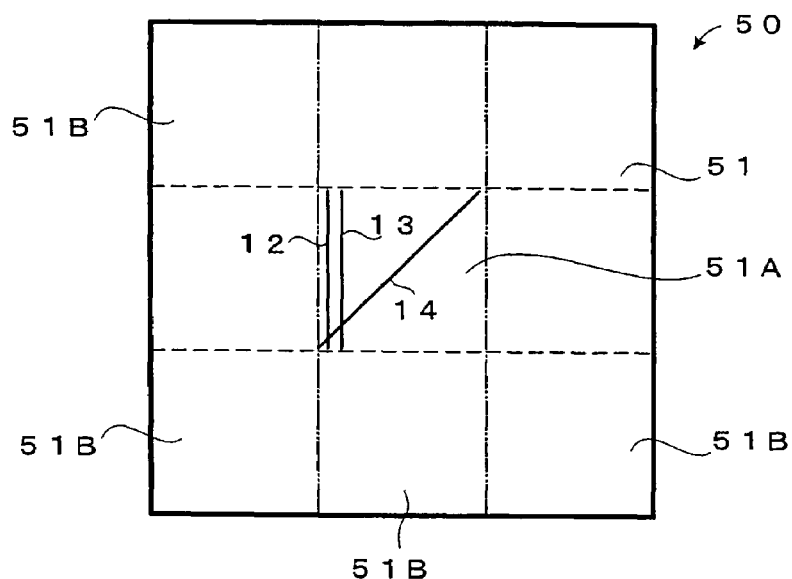
FIG. 7 is a plan view showing a modification aspect of the first embodiment of the recording medium of the present invention.

For convenience of explanation, on the recording medium 10 in FIG. 1, the first line segments 12/13 and second line segment 14 as being the position information are formed in the entire area of the recording surface 11. Such an embodiment is conceivable in practice, but more realistically, like a recording medium 50 shown in FIG. 7, it is desirable that a position recognition area 51A is formed in one portion of a recording surface 51, and that the first line segments 12/13 and the second line segment 14 are formed only in the position recognition area 51A. In this case, the information to be recorded by the recording apparatus is recorded mainly in information recording areas 51B in the recording surface 51. For example, if the recording surface 51 of the recoding medium 50 is divided into one position recognition area 51A and eight position recognition areas 51B, as shown in FIG. 7, nine probes, each corresponding to relative one of the areas 51A and 51B, are mounted on the head of the recording apparatus. The position of the head on the recording surface 51 is recognized by the probe corresponding to the position recognition area 51A, and the information is recorded and read by the probes corresponding to the position recognition areas 51B.

Figure 8:
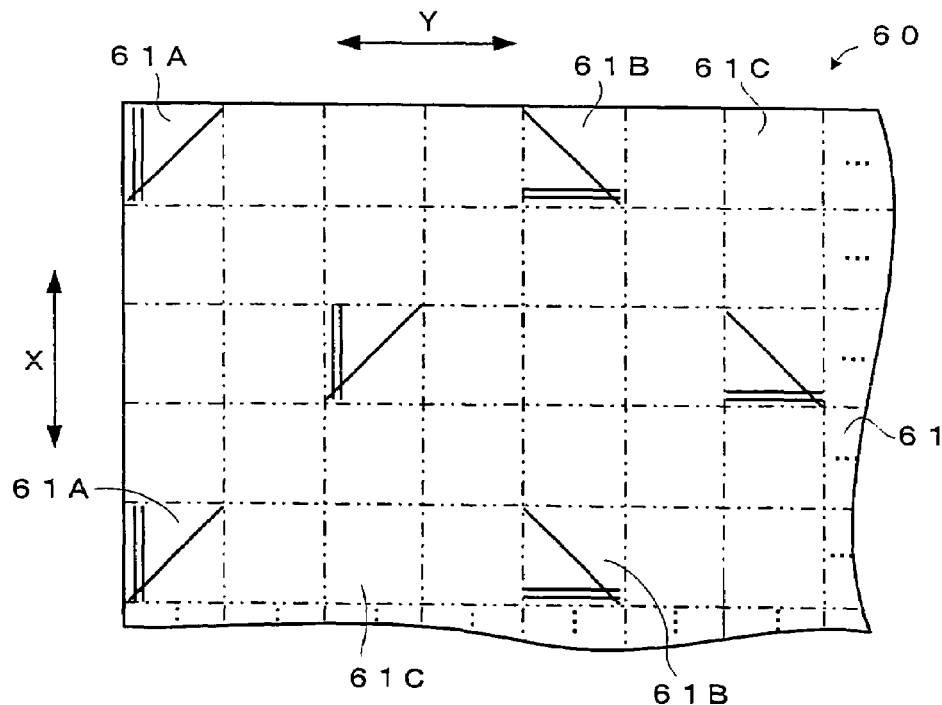
FIG. 8 is a plan view showing a modification aspect of the first embodiment of the recording medium of the present invention.

Moreover, like a recording medium 60 shown in FIG. 8, it may be constructed such that a plurality of position recognition areas 61A and 61B are formed on a recording surface 61. In this case, the position recognition in the Y axis direction is performed on the basis of the position information (three line segments in total) formed in the position recognition area 61A. The position recognition in the X axis direction is performed on the basis of the position information (three line segments in total) formed in the position recognition area 61B. The recording of the information is performed with respect to information recording areas 61C.

As described above, according to the recording media 10 to 60 as being the first embodiment of the present invention, it is possible to easily form the position information because the position information is constructed from the first line segments 12/13 and the second line segment 14. Even if the recording density of the information increases and the track pitch extremely decreases, easiness of the formation of the first line segments 12/13 and the second line segment 14 hardly changes. Therefore, even if the recording density of the data increases, it is possible to accurately recognize a position on the recording surface 11. Moreover, because the position information is easily formed, it is possible to reduce a format time length for the recording medium 10.

Furthermore, according to the recording media 10 to 60, the first line segments 12/13, which are parallel to each other, are formed on the recording surface 11, so that it is possible to measure or calculate the distance between (i) the first line segment 12 or 13 and a scan line and (ii) the second line segment 14 and the scan line, on the basis of the distance d1 between (i) an intersection of the first line segment 12 and a scan line and (ii) an intersection of the first line segment 13 and the scan line. By this, it is possible to recognize a position on the recording surface 11 highly accurately.

Second Embodiment of Recording Medium

Figure 9:
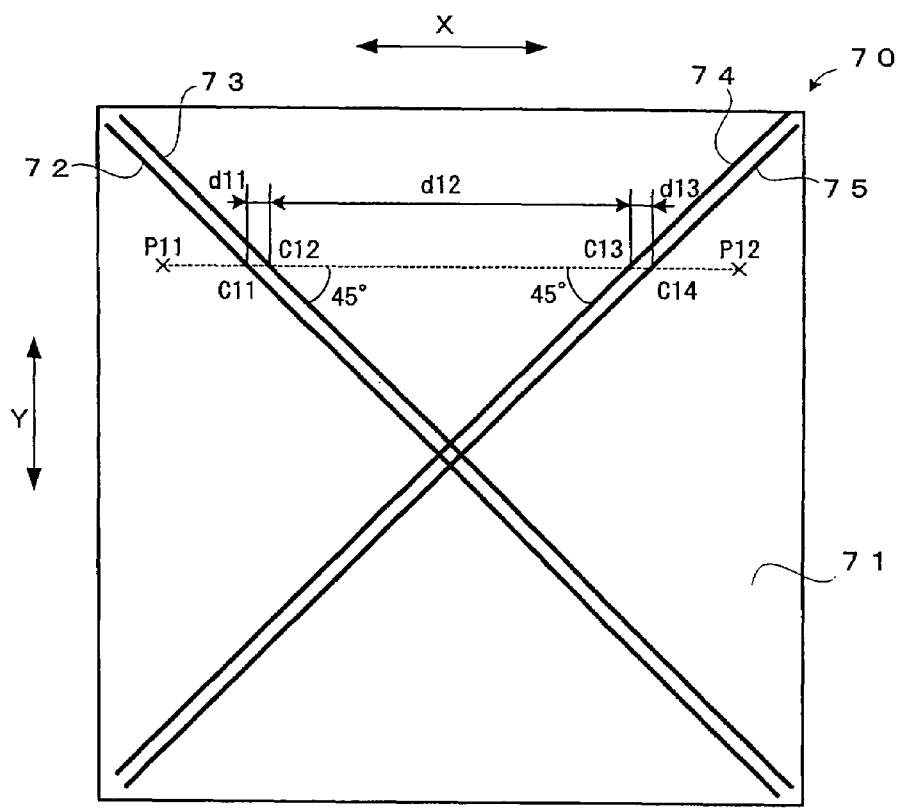
FIG. 9 is a plan view showing a second embodiment of the recording medium of the present invention.

The second embodiment of the recording medium of the present invention will be explained. FIG. 9 shows the second embodiment of the recording medium of the present invention. The application, material, outer shape, and size of a recording medium 70 shown in FIG. 9 are substantially the same as those of the recording medium 10 shown in FIG. 1, and matters in these points, which are not limited at least in the recording medium 10, are not limited in the recording medium 70, either.

As shown in FIG. 9, the recording medium 70 has a recording surface 71, and on the recording surface 71, position information for recognizing a position on the recording surface 71 is recorded. The position information includes first line segments 72/73 and second line segments 74/75.

The first line segments 72 and 73 are formed by giving physical features which are different from those of the other part on the recording surface 71. The number of the first line segments 72 and 73 is two. The first line segments 72 and 73 are disposed parallel to each other. The first line segments 72 and 73 are also disposed to be adjacent each other. Incidentally, the first line segments 72 and 73 shown in FIG. 9 are just an example, except that they are parallel to each other. The number of the first line segments may be equal to or greater than two. With respect to the position relationship between the first line segments 72 and 73, the first line segments 72 and 73 are not necessarily adjacent each other if parallel to each other.

With respect to the first line segments 72 and 73, their upper ends are placed in the vicinity of the upper left end of the recording surface 71, and their lower ends are placed in the vicinity of the lower right end of the recording surface 71. The first line segments 72 and 73 extend straight from the vicinity of the upper left end to the vicinity of the lower right end of the recording surface 71. Incidentally, the positions of the end portions of the first line segments 72 and 73 and the lengths thereof are not limited to this example. The widths of the first line segments 72 and 73 are not limited, either.

The second line segments 74 and 75 are formed by giving physical features which are different from those of the other part on the recording surface 71. The number of the second line segments is two. The second line segments 74 and 75 are disposed parallel to each other. The second line segments 74 and 75 are also disposed to be adjacent each other. Incidentally, the second line segments 74 and 75 shown in FIG. 9 are just an example, except that they are parallel to each other. The number of the second line segments may be two or more. With respect to the position relationship between the second line segments 74 and 75, the second line segments 74 and 75 are not necessarily adjacent each other, if parallel to each other.

With respect to the second line segments 74 and 75, their upper ends are placed in the vicinity of the upper right end of the recording surface 71, and their lower ends are placed in the vicinity of the lower left end of the recording surface 71. The second line segments 74 and 75 extend straight from the vicinity of the upper right end to the vicinity of the lower left end of the recording surface 71. Incidentally, the positions of the end portions of the second line segments 74 and 75 and the lengths thereof are not limited to this example. The widths of the second line segments 74 and 75 are not limited, either.

The first line segments 72/73 and the second line segments 74/75 are disposed to cross each other on the recording surface 71. More specifically, the first line segments 72/73 and the second line segments 74/75 cross substantially in the center of the recoding surface 71. An angle at which the first line segments 72/73 and the second line segments 74/75 cross is 90 degrees. Incidentally, the interval between the first line segments 72 and 73 is equal to the interval between the second line segments 74 and 75. Incidentally, it is not necessary to dispose the first line segments 72/73 and the second line segments 74/75 to cross each other on the recording surface 71. Namely, the first line segments 72/73 and the second line segments 74/75 may be disposed such that at least one of the first line segments 72/73 or an extension line of at least one of the first line segments 72/73 crosses at least one of the second line segments 74/75 or an extension line of at least one of the second line segments 74 and 75. The angle at which the first line segments 72/73 or the extension lines of the first line segments 72/73 cross the second line segments 74/75 or the extension lines of the second line segments 74/75 is not limited, either. However, in the case where the angle at which the first line segments 72/73 or the extension lines of the first line segments 72/73 cross the second line segments 74/75 or the extension lines of the second line segments 74/75 is 90 degrees and where the intersections are disposed in the center of the recording surface 71, even if the recording medium 70 is rotated at 90 degrees on the recording surface 71, the arrangement of the first line segments 72/73 and the second line segments 74/75 is the same, which is advantageous. This is useful because in scanning the recording medium 71 in the X axis direction and the Y axis direction, a detection procedure for each line segment and a position recognition procedure are in common in both case of the X axis direction and the Y axis direction. The interval between the first line segments 72/73 and the interval between the second line segments 74/75 are not necessarily equal. However, by setting the intervals to be the same, it is possible to accurately recognize a position on the recording surface 71 even if the position relationship between the recording medium 70 and the head of the recording apparatus are misaligned. This will be described later.

As shown in FIG. 9, the first line segments 72 and 73 are desirably at +45 degrees to a prearranged scan direction for recording or reading the information with respect to the recording surface 71 (i.e. a scan direction of the head when the recording medium has a correct position relationship with the head of the recording apparatus, e.g. a straight line between P11 and P12 in FIG. 9). Moreover, the second line segments 74 and 75 are desirably at −45 degrees to the prearranged scan line. As described above, the angle of the first line segments 72 and 73 to the prearranged scan direction is equal to the angle of the second line segments 74 and 75 to the prearranged scan line, by which it is possible to accurately recognize a position on the recording surface even if the position relationship between the recording medium 71 and the head of the recording apparatus are misaligned. This will be described later.

Incidentally, physical features of each line segment (e.g. whether it is concave, whether it is an amorphous phase, or the like) are the same as those in the first embodiment of the recording medium (FIG. 2 to FIG. 5). If the recording layer of the recording medium is the polymer material, such as PMMA, it is possible to easily form each line segment by emitting laser light onto the recording surface and displacing it linearly.

Figure 10:
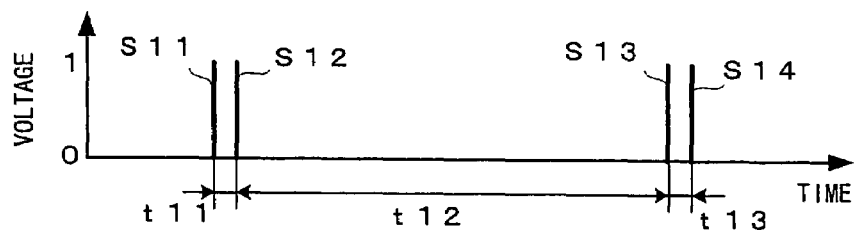
FIG. 10 is a graph showing pulse signals obtained by scanning line segments.

The principle of recognizing a position on the recording surface 71 on the basis of the first line segments 72/73 and the second line segments 74/75 is as follows. In FIG. 9, at first, it is assumed that the head of the recording apparatus is displaced from P11 to P12 at a predetermined speed and scans between P11 and P12. In this case, a scan line of the head crosses the first line segment 72 at an intersection C11, crosses the first line segment 73 at an intersection C12, crosses the second line segment 74 at an intersection C13, and crosses the second line segment 75 at an intersection C14. Along with the displacement of the head, pulse signals S11, S12, S13, and S14 as shown in FIG. 10 are obtained from the head. The pulse signal S11 is obtained when the head passes the intersection C11. The pulse signal S12 is obtained when the head passes the intersection C12. The pulse signal S13 is obtained when the head passes the intersection C13. The pulse signal S14 is obtained when the head passes the intersection C14. A time length t11 between the pulse signal S11 and the pulse signal S12 corresponds to a distance d11 between the intersection C11 and the intersection C12. A time length t12 between the pulse signal S12 and the pulse signal S13 corresponds to a distance d12 between the intersection C12 and the intersection C13. Therefore, by comparing the time length t11 and the time length t12, it is possible to measure or calculate the distance d12 based on the distance d11.

If the head is displaced in the Y direction shown with an arrow in FIG. 9, a distance between (i) an intersection of the first line segment 73 and a scan line and (ii) an intersection of the second line segment 74 and the scan line varies. However, even if the head is displaced in the Y direction shown with an arrow, a distance between (i) an intersection of the first line segment 72 and a scan line and (ii) an intersection of the first line segment 73 and the scan line does not change and is always d11. This is because the first line segment 72 and the first line segment 73 are parallel to each other. Therefore, by measuring or calculating the distance between (i) an intersection of the first line segment 73 and a scan line and (ii) an intersection of the second line segment 74 and the scan line on the basis of the distance d11 between (i) an intersection of the first line segment 72 and a scan line and (ii) an intersection of the first line segment 73 and the scan line, it is possible to recognize the position of the head in the Y direction shown with the arrow. Particularly, by using the distance d11, which is between (i) an intersection of the first line segment 72 and a scan line and (ii) an intersection of the first line segment 73 and the scan line, as a standard of measuring or calculating the distance between (i) an intersection of the first line segment 73 and a scan line and (ii) an intersection of the second line segment 74 and the scan line, the highly accurate position recognition can be performed.

The above-description about the principle of the position recognition is substantially the same as the case of the recording medium 10 shown in FIG. 1 and FIG. 6. However, in the recording medium 70, it is also possible to recognize position misalignment of the recording medium 70. As described above, the time length t11 between the pulse signals S11 and S12 corresponds to the distance d11 between the intersections C11 and C12. On the other hand, the time length t13 between the pulse signals S13 and S14 corresponds to the distance d13 between the intersections C13 and C14. As described above, the interval between the first line segments 72 and 73 is equal to the interval between the second line segments 74 and 75. The absolute value (45 degrees) of the angle of the first line segments 72 and 73 to the prearranged scan direction of the head (e.g. the straight line between P11 and P12) is equal to the absolute value (45 degrees) of the angle of the second line segments 74 and 75 to the prearranged scan direction. Therefore, if the recording medium 70 is mounted onto the recording apparatus without position misalignment and there is no position misalignment between the recording medium 70 and the head of the recording apparatus, the time length t11 and the time length t13 are equal (t11=t13) as shown in FIG. 10.

Figure 11:
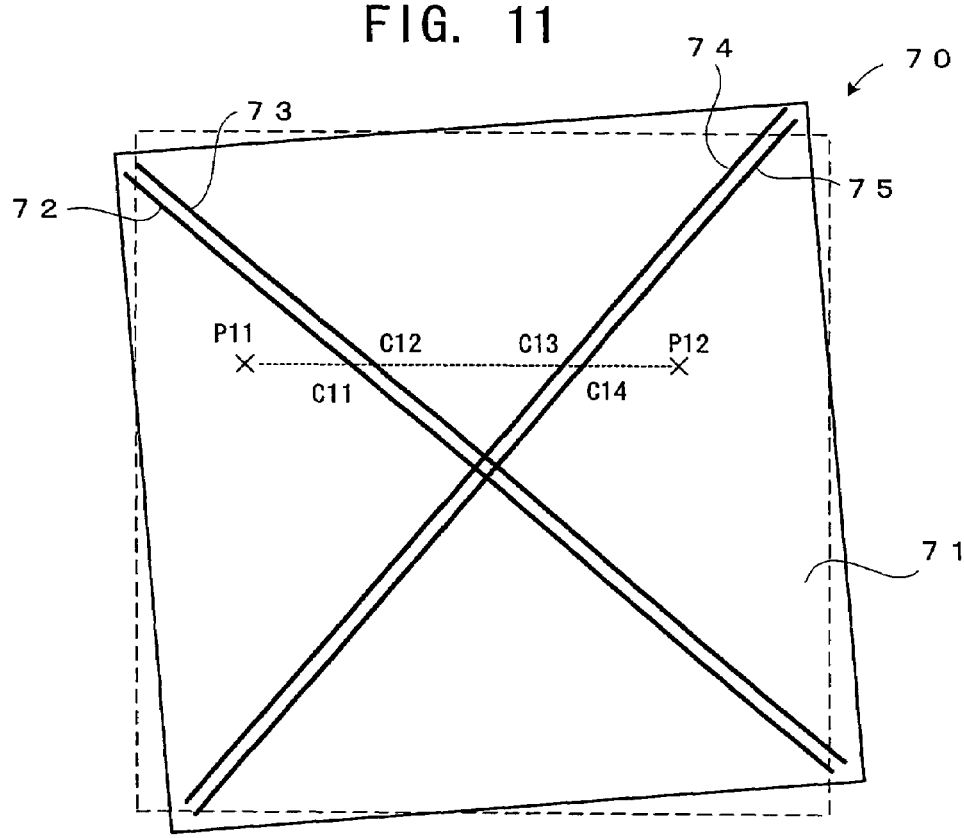
FIG. 11 is a plan view showing a misaligned condition of mounting the recording medium.
Figure 12:
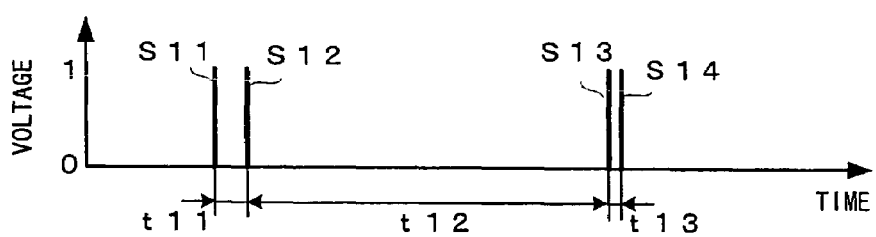
FIG. 12 is a graph showing pulse signals obtained by scanning line segments under the misaligned condition of mounting the recording medium.

However, as shown in FIG. 11, if the recording medium 70 is mounted such that the recording medium 70 is misaligned to slightly rotate on the recording surface 71 and there is position misalignment between the recording medium 70 and the head of the recording apparatus, the actual scan direction of the head deviates from the prearranged scan direction. This causes a difference between (i) the absolute value of the angle of the first line segments 72 and 73 to the actual scan direction of the head and (ii) the absolute value of the angle of the second line segments 74 and 75 to the actual scan direction of the head. Due to this, a timing of the head passing the intersection of each line segment and the scan line shifts, and as shown in FIG. 12, timings of obtaining the pulse signals S11, S12, S13, and S14 change. As a result, there arises a differences between the time length t11 and the time length t13 (t11>t13 in the example in FIG. 12).

In this case, if (i) the angle between the prearranged scan direction and the actual scan direction of the head (hereinafter referred to as a "mounting-misalignment-angle"), which is generated by the position misalignment of the recording medium 70 caused by the slight rotation, is regarded as $\theta$, (ii) the interval between the first line segment 72 and the first line segment 73 (=the interval between the second line segment 74 and the second line segment 75) is regarded as D, and (iii) the scanning speed of the head is regarded as S, then, the time length t11 and the time length t13 can be expressed with the following formulae (1) and (2), respectively.

$$t11 = D/[S \cdot \cos\{(\pi/4)+\theta\}] \quad (1)$$

$$t13 = D/[S \cdot \cos\{(\pi/4)-\theta\}] \quad (2)$$

It is possible to calculate the mounting-misalignment-angle $\theta$ from the known value D and the calculated t11 and t13 by eliminating S from the two formulae. It is also possible to check the mounting-misalignment-angle $\theta$ from a rate of change of a difference between t11 and t13.

If the mounting-misalignment-angle $\theta$ can be recognized in this manner, it is possible to recognize a position on the recording surface 71 highly accurately, while correcting the misalignment between the recording medium and the head (i.e. a gap between the prearranged scan direction and the actual scan direction), on the basis of the mounting-misalignment-angle $\theta$. The correction may be performed by operation processing or by rotating the recording medium 70 by using a rotational mechanism.

For convenience of explanation, on the recording medium 70 in FIG. 9, the first line segments 72/73 and the second line segments 74/75 as being the position information are formed in the entire area of the recording surface 71. Such an embodiment is conceivable in practice, but more realistically, it is desirable that a position recognition area is formed in one portion of the recording surface 71, and that the first line segments 72/73 and the second line segments 74/75 are formed only in the position recognition area (refer to FIG. 7). It is also possible to form a plurality of position recognition areas on the recording surface 71 (refer to FIG. 8). In this case, the misalignment in the rotational direction of the recording medium 70 is recognized on the basis of the first line segments 72/73 and the second line segments 74/75 (or a part of the first line segment 72/73 and the second line segment 74/75) formed in the position recognition area placed in the center of the recording medium 70.

As described above, according to the recording medium 70 as being the second embodiment of the present invention, it is possible to easily form the position information, as with the recoding medium 10, because the position information is constructed from the first line segments 72/73 and the second line segments 74/75. Therefore, even if the recording density of the data increases, it is possible to accurately recognize a position on the recording surface 71, and it is possible to reduce a format time length for the recording medium 70. Moreover, since not only the first line segments but also the second line segments are two or more parallel line segments, it is possible to accurately recognize a position on the recording surface 71 even if there is position misalignment between the recording medium 70 and the head of the recording apparatus.

Third Embodiment of Recording Medium

Figure 13:
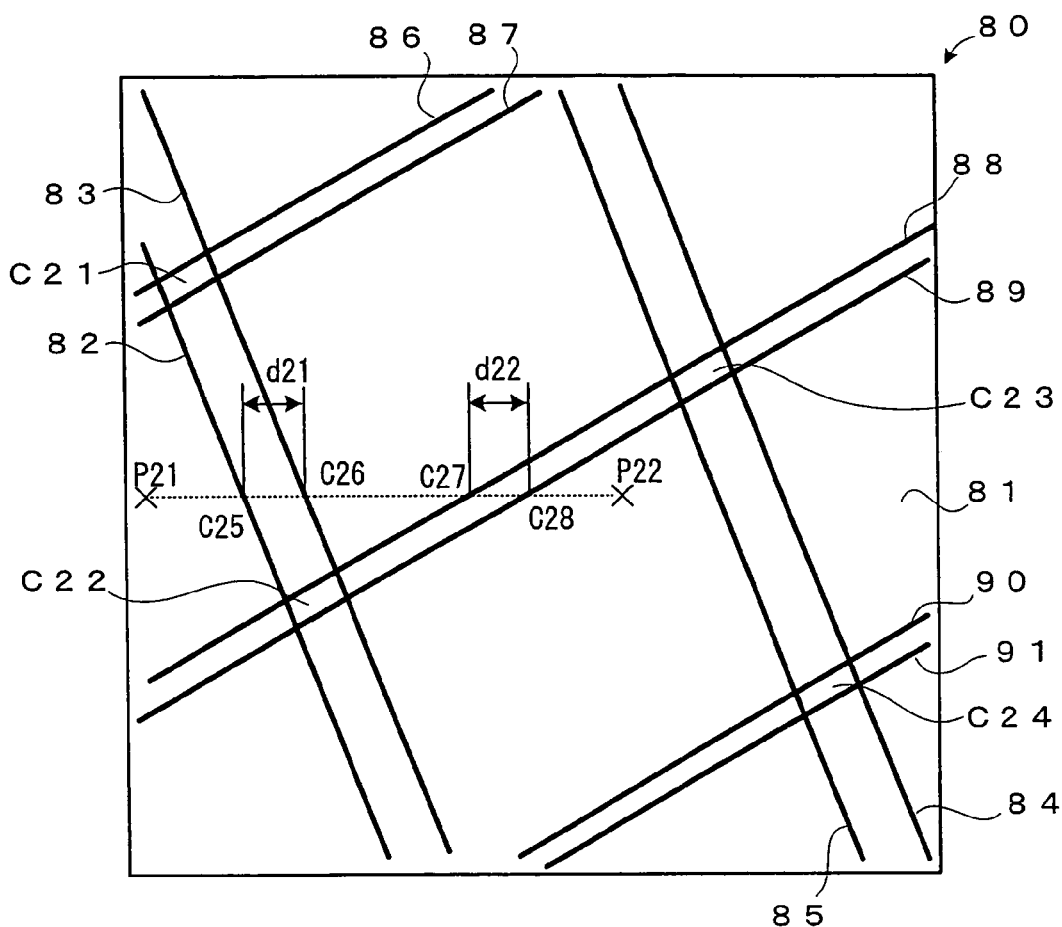
FIG. 13 is a plan view showing a third embodiment of the recording medium of the present invention.

The third embodiment of the recording medium of the present invention will be explained. FIG. 13 shows the third embodiment of the recording medium of the present invention. The basic structure of a recording medium 80 shown in FIG. 13 is substantially the same as that of the recording medium 70 shown in FIG. 9. However, on a recording surface 81, there are two pairs of two mutually parallel first line segments. Namely, they are one pair of two first line segments 82 and 83, and another pair of two first line segments 84 and 85. Moreover, on the recording surface 81, there are three pairs of two mutually parallel second line segments. Namely, they are one pair of two second line segments 86 and 87, another pair of two second line segments 88 and 89, and further another pair of two second line segments 90 and 91. Incidentally, the number of pairs of the first line segments and the number of pairs of the second line segments are not limited to this example.

The first line segments 82 and 83 and the second line segments 86 and 87 cross at an intersection (intersection area) C21. The first line segments 82 and 83 and the second line segments 88 and 89 cross at an intersection (intersection area) C22. The first line segments 84 and 85 and the second line segments 88 and 89 cross at an intersection (intersection area) C23. The first line segments 84 and 85 and the second line segments 90 and 91 cross at an intersection (intersection area) C24.

Figure 14:
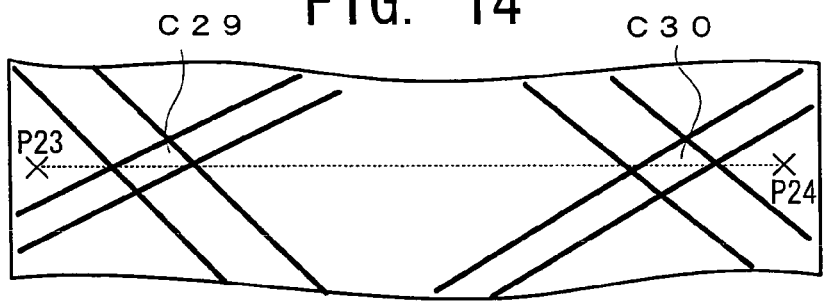
FIG. 14 is a plan view showing a condition in which a scanning line passes intersections of line segments.

Then, each of the line segments 82 to 91 is disposed such that an arbitrary straight line parallel to a prearranged scan direction of the head (e.g. a straight line between P21 and P22) crosses any one of the first line segments 82 to 85 and any one of the second line segments 86 to 91 in any place except the intersections C21, C22, C23, and C24. Such arrangement can be realized by making the absolute value of an angle of the first line segments 82 to 85 to the prearranged scan direction of the head different from the absolute value of an angle of the second line segments 86 to 91 to the prearranged scan direction of the head. By this, it is possible to recognize a position in any place on the recording surface 81. For example, if the arrangement of the first line segments and the second line segments is as shown in FIG. 14, a scan line of the head (i.e. a straight line between P23 and P24) may pass only an intersection C29 and C30 which are made with the first line segments and the second line segments. In this case, it is impossible to recognize the position of the head on the recording surface because it is impossible to measure or calculate a distance between the first line segment and the second line segment. In order to avoid this situation, it is desirable to arrange the first line segments and the second line segments as shown in FIG. 13.

Figure 15:
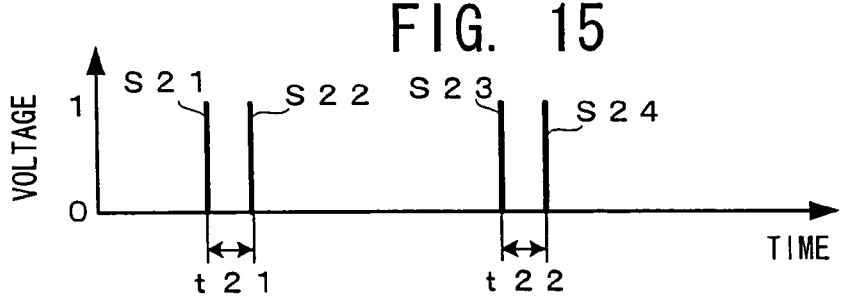
FIG. 15 is a graph showing pulse signals obtained by scanning the line segments.

Moreover, for example, it is assumed that the head scans from P21 to P22, that an intersection of the scan line and the first line segment 82 is C25, that an intersection with the first line segment 83 is C26, an intersection with the second line segment 88 is C27, and an intersection with the second line segment 89 is C28. In this case, a distance d21 between the intersections C25 and C26 is equal to a distance d22 between the intersections C27 and C28. Namely, the interval between the first line segments 82 and 83, and the interval between the second line segments 88 and 89 are set to satisfy the above arrangement condition. In this case, when the head is displaced on the scan line, pulse signals S21 to S24 corresponding to the intersections C25 to C28 are obtained, respectively, as shown in FIG. 15. If a position relationship between the recording medium 80 and the head is correct, a time length t21 between the pulse signals S21 and S22 is equal to a time length t22 between the pulse signals S23 and S24. Incidentally, the interval between the first line segments 84 and 85 is equal to the interval between the first segments 82 and 83. The interval between the second line segments 88 and 89 and the interval between the second line segments 90 and 91 are equal to the interval between the second line segments 86 and 87. The first line segments 82 to 85 are all disposed parallel to each other. The second line segments 86 to 91 are also all disposed parallel to each other. Therefore, in any combination of the first line segments and the second line segments, which cross each other, the above arrangement condition is satisfied.

As described above, according to the recording medium 80, it is possible to recognize every position on the recording surface 81 highly accurately and easily.

Fourth Embodiment of Recording Medium

Figure 16:
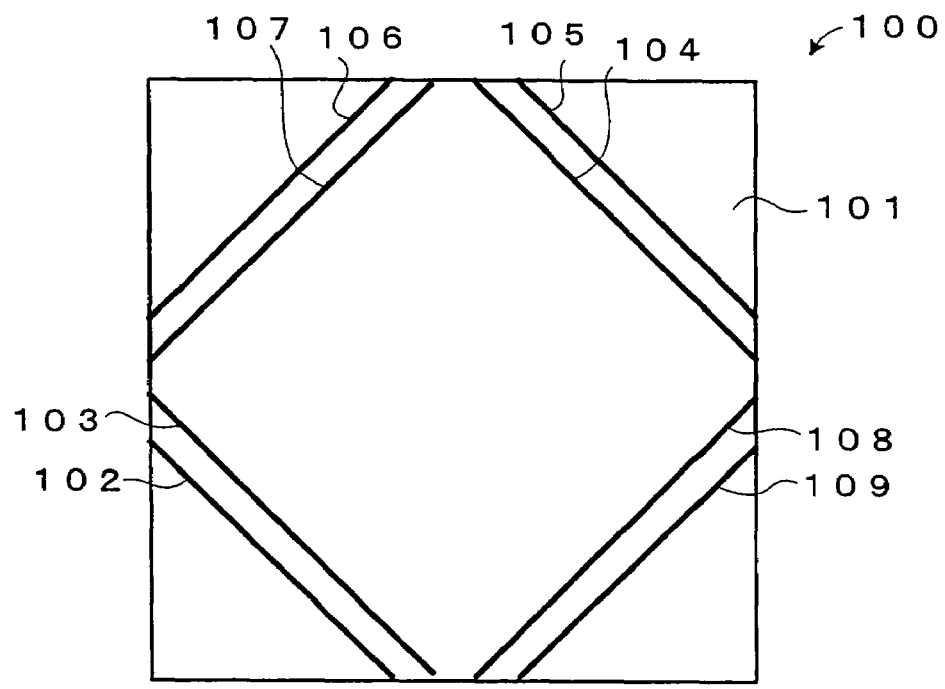
FIG. 16 is a plan view showing a fourth embodiment of the recording medium of the present invention.

The fourth embodiment of the recording medium of the present invention will be explained. FIG. 16 shows the fourth embodiment of the recording medium of the present invention. The basic structure of a recording medium 100 shown in FIG. 16 is substantially the same as that of the recording medium 70 shown in FIG. 9. However, on a recording surface 101 of the recording medium 100, there are two pairs of first line segments. Namely, they are one pair of two first line segments 102 and 103, and another pair of two first line segments 104 and 105. Moreover, on the recording surface 101, there are two pairs of second line segments. Namely, they are one pair of two second line segments 106 and 107, and another pair of two second line segments 108 and 109. With respect to the first line segments 102 and 103 and the second line segments 106 and 107, their extension lines cross outside the recording surface 101, so that there is not any intersection of these line segments on the recording surface 101. In the same manner, on the recording surface 101, there are not any intersection of the first line segments 102 and 103 and the second line segments 108 and 109, any intersection of the first line segments 104 and 105 and the second line segments 106 and 107, and any intersection of the first line segments 104 and 105 and the second line segments 108 and 109. As a result, it is possible to prevent such disadvantage that a position on the recording surface 101 cannot be recognized by the scan line of the head passing on the intersections.

Fifth Embodiment of Recording Medium

Figure 17:
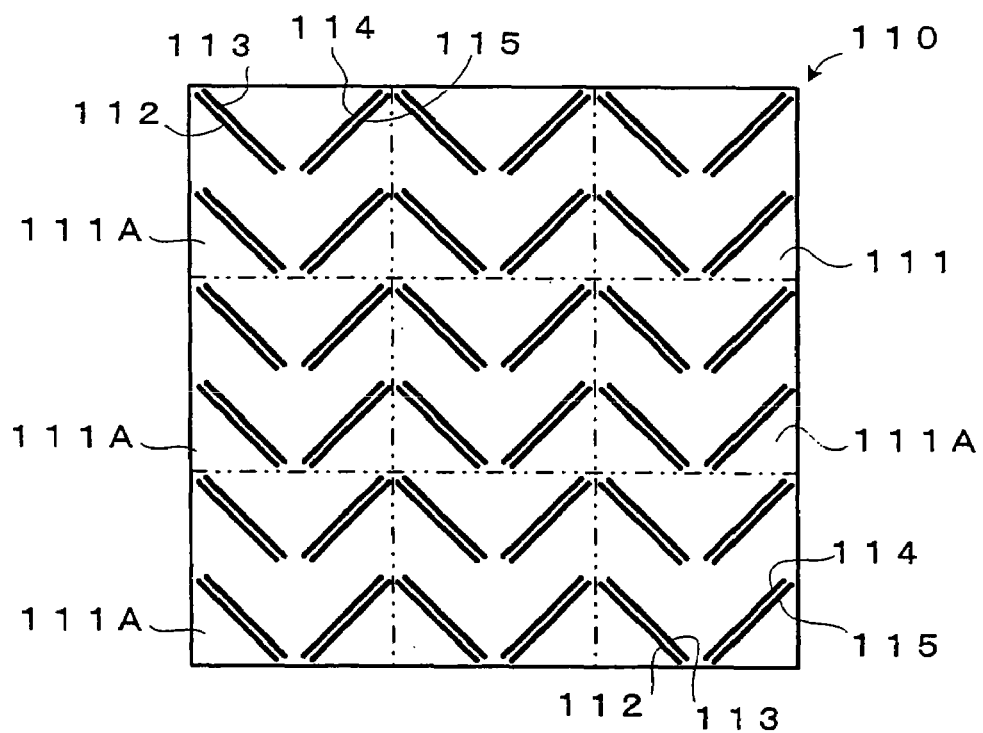
FIG. 17 is a plan view showing a fifth embodiment of the recording medium of the present invention.

The fifth embodiment of the recording medium of the present invention will be explained. FIG. 17 shows the fifth embodiment of the recording medium of the present invention. The basic structure of a recording medium 110 shown in FIG. 17 is substantially the same as that of the recording medium 70 shown in FIG. 9. However, a recording surface 111 of the recording medium 110 is divided into a plurality of zones 11A, and first line segments 112 and 113 and second line segments 114 and 115 are disposed in each zone 111A. Namely, the first line segments 112 and 113 and the second line segments 114 and 115 are segmentalized into a plurality of line segments in each zone 111A. By this, it is possible to recognize a position in each zone 111A, and it is possible to realize address management for each zone 111A, or the like.

Sixth Embodiment of Recording Medium

Figure 18:
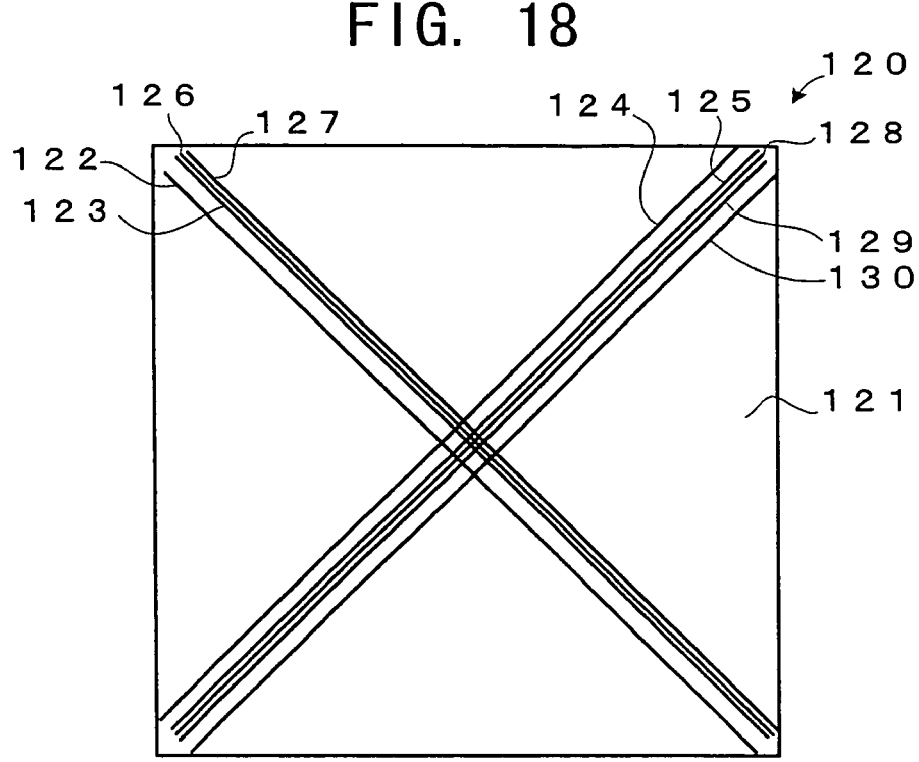
FIG. 18 is a plan view showing a sixth embodiment of the recording medium of the present invention.

The sixth embodiment of the recording medium of the present invention will be explained. FIG. 18 shows the sixth embodiment of the recording medium of the present invention. The basic structure of a recording medium 120 shown in FIG. 18 is substantially the same as that of the recording medium 70 shown in FIG. 9. However, on a recording surface 121 of the recording medium 120, there are third line segments 126 to 130 in addition to first line segments 122 and 123 and second line segments 124 and 125.

The third line segments 126 to 130 are formed by giving physical features which are different from those of the other part on the recording surface 121. The third line segments 126 and 127 are disposed parallel to the first line segments 122 and 123. The third line segments 128 to 130 are disposed parallel to the second line segments 124 and 125.

An interval between the third line segments which are adjacent to each other (e.g. the interval between the third line segments 126 and 127, or the like) may be different for each line segment pair. For example, the interval between the third line segments which are adjacent to each other may be different between (i) a group of the first line segments 122 and 123 and the third line segments 126 and 127 and (ii) a group of the second line segments 124 and 125 and the third line segments 128, 129, and 130. An interval between the first line segment and the third line segment (e.g. the interval between the first line segment 123 and the third line segment 126, or the like) may be different for each line segment pair. If there are a plurality of position recognition areas on the recording surface 121, an interval between these may be different in each position recognition area.

Moreover, the number of the third line segments may be different for each line segment pair or in each position recognition area.

As described above, by varying the interval or the number of the third line segments, or the like, it is possible to distinguish a particular group from among a plurality of groups of the line segments. Alternatively, it is possible to distinguish a particular position recognition area from among a plurality of position recognition areas. Namely, it is possible to show address information by the third line segments.

(Other Aspects of Recording Medium)

Figure 19:
FIG. 19 is a plan view showing one aspect of the line segment associated with one of the embodiment of the recording medium of the present invention.
Figure 20:
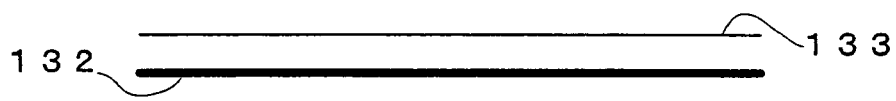
FIG. 20 is a plan view showing another aspect of the line segment associated with one of the embodiment of the recording medium of the present invention.

Other aspects of the recording medium of the present invention will be explained. FIG. 19 to FIG. 23 show various aspects of the line segment to be formed on the recording surface of the recording medium of the present invention. As shown in FIG. 19, it is possible to vary the width of a line segment 131 according to a predetermined rule. By this, it is possible to give the address information to the width of the line segment 131. As shown in FIG. 20, it is possible to thicken a line segment 132 as a whole and to thin a line segment 133 as a whole. For example, the width of the line segment may be changed for each line segment group or in each position recognition area. By this, it is possible to give the address information to the width of the line segment.

Figure 21:
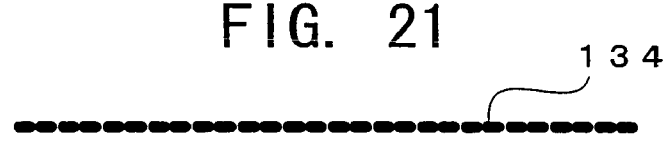
FIG. 21 is a plan view showing another aspect of the line segment associated with one of the embodiment of the recording medium of the present invention.

As shown in FIG. 21, it is possible to form a line segment 134 by arranging many points (dots) linearly. If an interval between the points which are adjacent to each other is made smaller than the reading resolution of the head, the arrangement of the points is substantially equivalent to a line segment.

Figure 22:
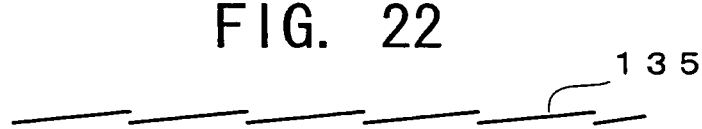
FIG. 22 is a plan view showing another aspect of the line segment associated with one of the embodiment of the recording medium of the present invention.

As shown in FIG. 22, it is also possible to form a line segment 135 as a whole by arranging a plurality of relatively shorter (or divided) line segments linearly. For example, if it is difficult to form a completely straight line on the recording surface for reasons of a crystal structure or the like, it is possible to form such shorter line segments that do not go against the crystal structure and arrange them linearly. Even in this case, if an interval between the short line segments or the like is made smaller than the reading resolution of the head, the arrangement of the shorter line segments is substantially equivalent to a line segment.

In the above embodiments of the recording medium, the line segments formed on the recording medium are used as the position information. However, on the basis of an interval between intersections of the line segments and a scan line, it is possible to measure or calculate the displacement speed of the head (or the displacement speed of the recording medium if the recording medium is displaced, with the head fixed) and stabilize this displacement. This can be realized by Phase Lock Loop (PLL) control of a cycle in which the head passes on the intersections of the line segments and the scan line.

First Embodiment of Position Recognition Apparatus

Figure 23:
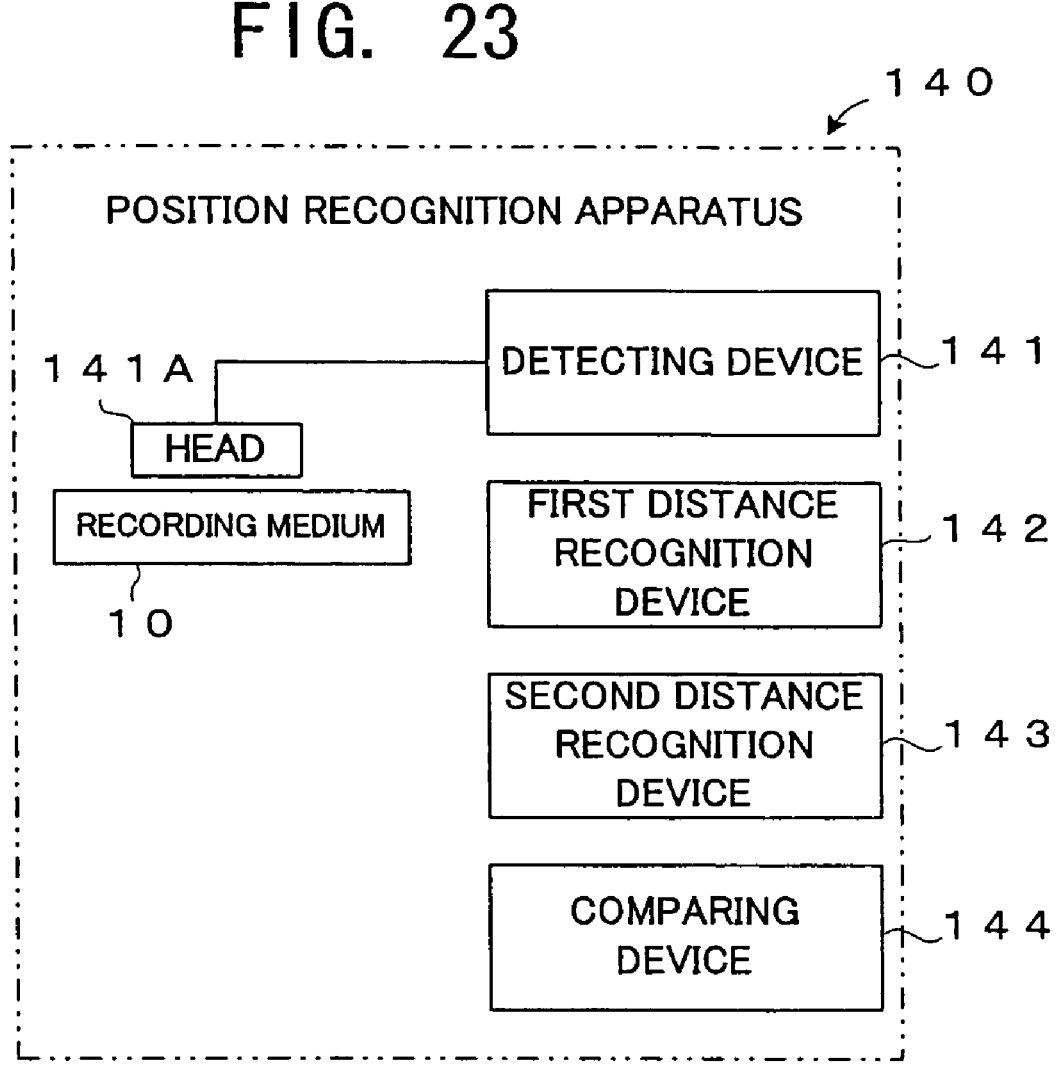
FIG. 23 is a block diagram showing a first embodiment of a position recognition apparatus of the present invention.

The first embodiment of the position recognition apparatus of the present invention will be explained. FIG. 23 shows the first embodiment of the position recognition apparatus of the present invention. A position recognition apparatus 140 shown in FIG. 23 is intended to recognize a position on a recording surface of a recording medium provided with: at least two first line segments, which are parallel to each other, formed by giving physical features which are different from those of other part on the recording surface; and at least one second line segment formed by giving physical features which are different from those of other part on the recording surface, the first line segments and the second line segment being disposed such that at least one of the first line segments or an extension line of at least one of the first line segments crosses the second line segment or an extension line of the second line segment. The position recognition apparatus 140 is a preferable apparatus for recognizing a position on the recording surface 11 of the recording medium 10 shown in FIG. 1, for example. The explanation below is about the case where a position on the recording surface 11 of the recording medium 10 is recognized by the position recognition apparatus 140.

The position recognition apparatus 140 is provided with: a detecting device 141; a first distance recognition device 142; a second distance recognition device 143; and a comparing device 144.

The detecting device 141 scans, by using a head 141A, for example, on a scan line, which crosses the first line segments 12/13 and the second line segment 14, to thereby detect the intersection of the first line segment 12 and the scan line, the intersection of the first line segment 13 and the scan line, and the intersection of the second line segment 14 and the scan line. For example, the detecting device 141 detects the intersections C1, C2, and C3 by the head scanning from P1 to P2 in FIG. 1, and outputs the result as the pulse signals S1, S2, and S3 in FIG. 6.

The first distance recognition device 142 recognizes a distance between (i) the intersection of the first line segment 12 and the scan line and (ii) the intersection of the first line segment 13 and the scan line, on the basis of a detection result of the detecting device 141. The first distance recognition device 142 can be realized with a counter, for example. In this case, for example, the first distance recognition device 142 recognizes the distance d1 between the intersection C1 and the intersection C2, by counting the time length t1 between the pulse signal S1 and the pulse signal S2 with the counter.

The second distance recognition device 143 recognizes a distance between (i) the intersection of the first line segment 13 and the scan line and (ii) the intersection of the second line segment 14 and the scan line, on the basis of the detection result of the detecting device 141. The second distance recognition device 143 can be realized with a counter, for example. In this case, for example, the second distance recognition device 143 recognizes the distance d2 between the intersection C2 and the intersection C3, by counting the time length t2 between the pulse signal S2 and the pulse signal S3 with the counter.

The comparing device 144 compares the distance recognized by the first distance recognition device 142 with the distance recognized by the second distance recognition device 143. By this, it is possible to measure or calculate the distance between (i) the intersection of the first line segment 13 and the scan line and (ii) the intersection of the second line segment 14 and the scan line, on the basis of the distance between (i) the intersection of the first line segment 12 and the scan line and (ii) the intersection of the first line segment 13 and the scan line. Then, by the above-described principle of the position recognition, it is possible to recognize the position of the head in the Y direction shown with the arrow.

Incidentally, by the second distance recognition device 143, it is possible to recognize, not the distance between (i) the intersection of the first line segment 13 and the scan line and (ii) the intersection of the second line segment 14 and the scan line, but the distance between (i) the intersection of the first line segment 12 and the scan line and (ii) the intersection of the second line segment 14 and the scan line. Moreover, by the comparing device 144, it is also possible to measure or calculate the distance between (i) the intersection of the first line segment 12 and the scan line and (ii) the intersection of the second line segment 14 and the scan line, on the basis of the distance between (i) the intersection of the first line segment 12 and the scan line and (ii) the intersection of the first line segment 13 and the scan line. By this, it is possible to recognize the position of the head in the Y direction shown with the arrow.

The position recognition apparatus 140 may be realized as an exclusive apparatus, but can be also realized by making a computer program, which realizes a position recognition method as described later, and by making a computer read this program. Namely, the position recognition method is intended to recognize a position on a recording surface of a recording medium provided with: at least two first line segments, which are parallel to each other, formed by giving physical features which are different from those of other part on the recording surface; and at least one second line segment formed by giving physical features which are different from those of other part on the recording surface, the first line segments and the second line segment being disposed such that at least one of the first line segments or an extension line of at least one of the first line segments crosses the second line segment or an extension line of the second line segment. The position recognition method is provided with: a detecting process of scanning on a scan line, which crosses the first line segments and the second line segment, to thereby detect an intersection of one of the first line segments and the scan line, an intersection of another of the first line segments and the scan line, and an intersection of the second line segment and the scan line; a first distance recognition process of recognizing a distance between (i) the intersection of one of the first line segments and the scan line and (ii) the intersection of another of the first line segments and the scan line, on the basis of a detection result of the detecting process; a second distance recognition process of recognizing a distance between (i) the intersection of one or another of the first line segments and the scan line and (ii) the intersection of the second line segment and the scan line, on the basis of the detection result of the detecting process; and a comparing process of comparing the distance recognized by the first distance recognition process with the distance recognized by the second distance recognition process.

Second Embodiment of Position Recognition Apparatus

Figure 24:
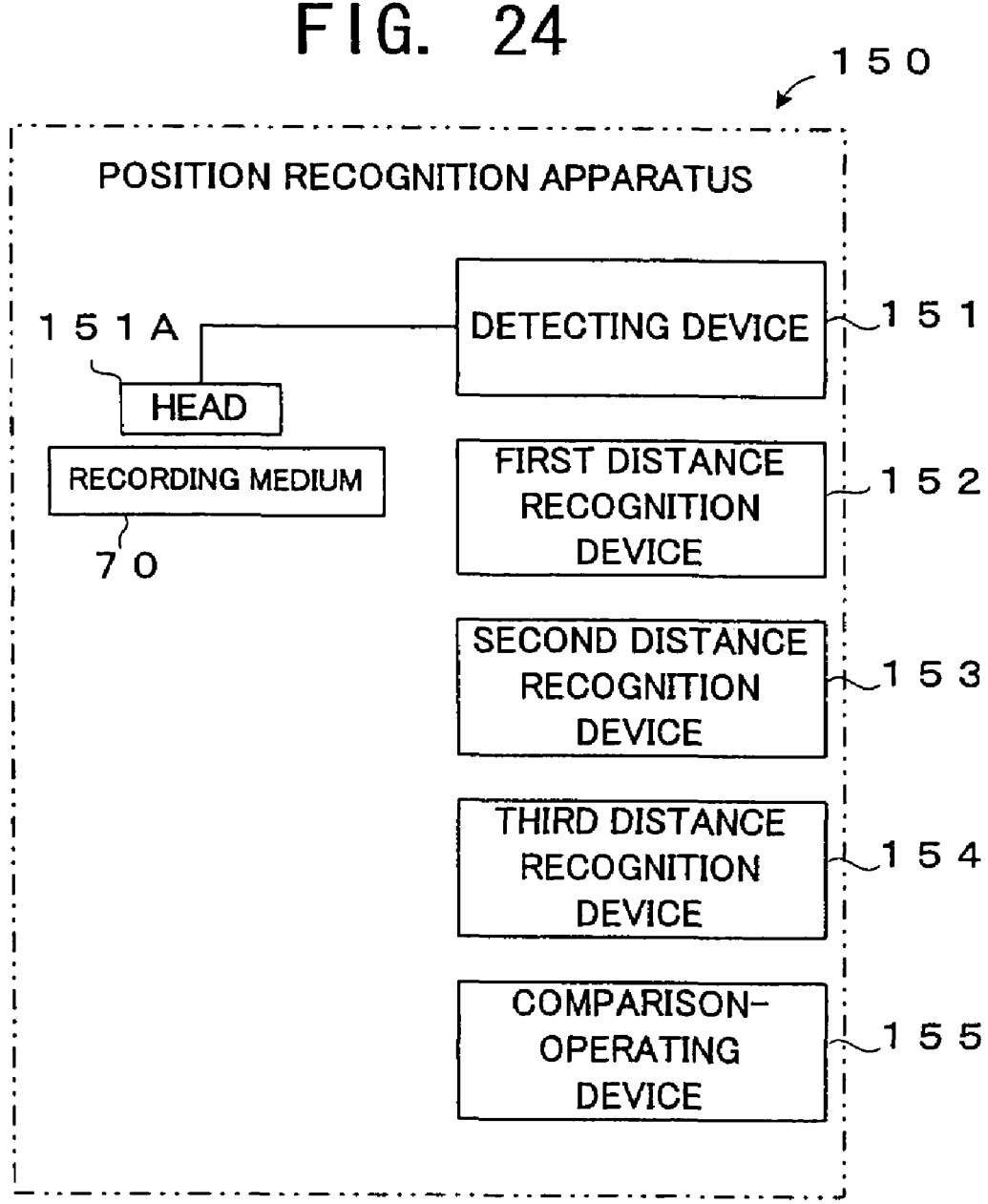
FIG. 24 is a block diagram showing a second embodiment of the position recognition apparatus of the present invention.

The second embodiment of the position recognition apparatus of the present invention will be explained. FIG. 24 shows the second embodiment of the position recognition apparatus of the present invention. A position recognition apparatus 150 shown in FIG. 24 is intended to recognize a position on a recording surface of a recording medium provided with: at least two first line segments, which are parallel to each other, formed by giving physical features which are different from those of other part on the recording surface; and at least two second line segments, which are parallel to each other, formed by giving physical features which are different from those of other part on the recording surface, the first line segments and the second line segments being disposed such that at least one of the first line segments or an extension line of at least one of the first line segments crosses at least one of the second line segments or an extension line of at least one of the second line segments. The position recognition information 150 is a preferable apparatus for recognizing a position on the recording surface 71 of the recording medium 70 shown in FIG. 9, for example. The explanation below is about the case where a position on the recording surface 71 of the recording medium 70 is recognized by the position recognition apparatus 150.

The position recognition apparatus 150 is provided with: a detecting device 151; a first distance recognition device 152; a second distance recognition device 153; a third distance recognition device 154; and a comparison-operating device 155.

The detecting device 151 scans, by using a head 161A, for example, on a scan line, which crosses the first line segments 72/73 and the second line segments 74/75, to thereby detect the intersection of the first line segment 72 and the scan line, the intersection of the first line segment 73 and the scan line, the intersection of the second line segment 74 and the scan line, and the intersection of the second line segment 75 and the scan line. For example, the detecting device 151 detects the intersections C11, C12, C13, and C14 by the head scanning from P11 to P12 in FIG. 9, and outputs the result as the pulse signals S11, S12, S13, and S14 in FIG. 10.

The first distance recognition device 152 recognizes a distance between (i) the intersection of the first line segment 72 and the scan line and (ii) the intersection of the first line segment 73 and the scan line, on the basis of a detection result of the detecting device 151. The first distance recognition device 152 can be realized with a counter, for example. In this case, for example, the first distance recognition device 152 recognizes the distance d11 between the intersection C11 and the intersection C12, by counting the time length t11 between the pulse signal S11 and the pulse signal S12 with the counter.

The second distance recognition device 153 recognizes a distance between (i) the intersection of the second line segment 74 and the scan line and (ii) the intersection of the second line segment 75 and the scan line, on the basis of the detection result of the detecting device 151. The second distance recognition device 153 can be realized with a counter, for example. In this case, for example, the second distance recognition device 153 recognizes the distance d13 between the intersection C13 and the intersection C14, by counting the time length t13 between the pulse signal S13 and the pulse signal S14 with the counter.

The third distance recognition device 154 recognizes a distance between (i) the intersection of the first line segment 73 and the scan line and (ii) the intersection of the second line segment 74 and the scan line, on the basis of the detection result of the detecting device 151. The third distance recognition device 154 can be realized with a counter, for example. In this case, for example, the third distance recognition device 154 recognizes the distance d12 between the intersection C12 and the intersection C13, by counting the time length t12 between the pulse signal S12 and the pulse signal S13 with the counter.

The comparison-operating device 155 performs comparison operation by using the distance recognized by the first distance recognition device 152, the distance recognized by the second distance recognition device 153, and the distance recognized by the third distance recognition device 154. For example, by comparing the distance recognized by the first distance recognition device 152 with the distance recognized by the third distance recognition device 154, it is possible to recognize the position of the head in the Y direction shown with the arrow (refer to FIG. 9), on the basis of the above-described principle of the position recognition.

Moreover, it is possible to recognize the position misalignment between the recording medium and the head (refer to FIG. 11 and FIG. 12) on the basis of the distance recognized by the first distance recognition device 152 and the distance recognized by the second distance recognition device 153.

The position recognition apparatus 150 may be realized as an exclusive apparatus, but can be also realized by making a computer program, which realizes a position recognition method as described later, and by making a computer read this program. Namely, the position recognition method is intended to recognize a position on a recording surface of a recording medium provided with: at least two first line segments, which are parallel to each other, formed by giving physical features which are different from those of other part on the recording surface; and at least two second line segments, which are parallel to each other, formed by giving physical features which are different from those of other part on the recording surface, the first line segments and the second line segments being disposed such that at least one of the first line segments or an extension line of at least one of the first line segments crosses at least one of the second line segments or an extension line of at least one of the second line segments. The position recognition method is provided with: a detecting process of scanning on a scan line, which crosses the first line segments and the second line segments, to thereby detect an intersection of one of the first line segments and the scan line, an intersection of another of the first line segments and the scan line, an intersection of one of the second line segments and the scan line, and an intersection of another of the second line segments and the scan line; a first distance recognition process of recognizing a distance between (i) the intersection of one of the first line segments and the scan line and (ii) the intersection of another of the first line segments and the scan line, on the basis of a detection result of the detecting process; a second distance recognition process of recognizing a distance between (i) the intersection of one of the second line segments and the scan line and (ii) the intersection of another of the second line segments and the scan line, on the basis of the detection result of the detecting process; a third distance recognition process of recognizing a distance between (i) the intersection of one or another of the first line segments and the scan line and (ii) the intersection of one or another of the second line segments and the scan line, on the basis of the detection result of the detecting process; and a comparison-operating process of performing comparison operation by using the distance recognized by the first distance recognition process, the distance recognized by the second distance recognition process, and the distance recognized by the third distance recognition process.

EXAMPLE

An example of the present invention will be hereinafter explained with reference to the drawings. In the example below, the present invention is applied to an information recording/reproducing apparatus for performing thermomechanical recording of information onto a recording medium by using a cantilever array and reading and reproducing the information recorded on the recording medium. This is a preferable one example to implement the prevent invention.

Figure 25:
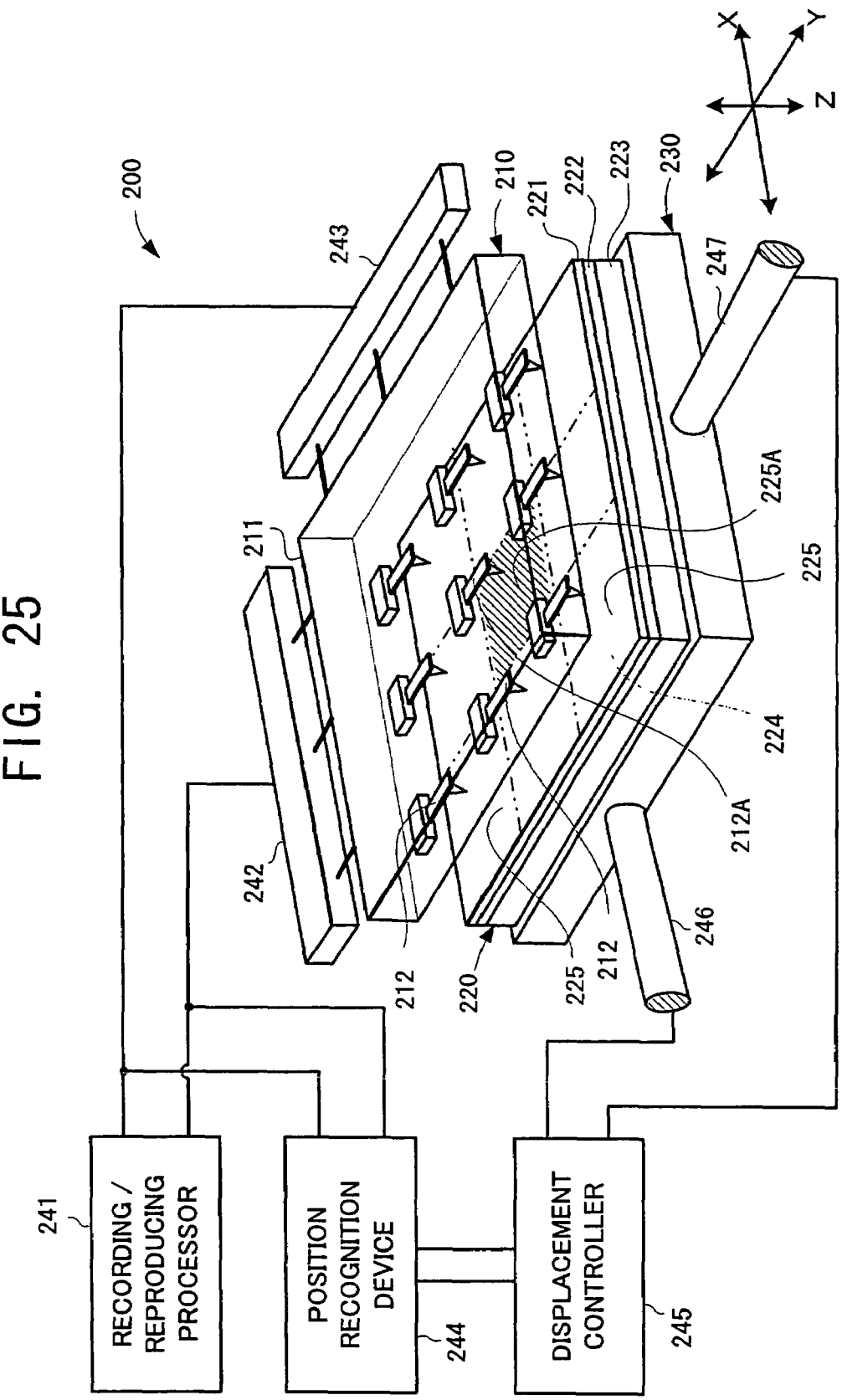
FIG. 25 is a block diagram showing an example of the position recognition apparatus of the present invention.

FIG. 25 shows a recording/reproducing apparatus 200 in the example of the present invention. The recording/reproducing apparatus 200 is provided with: a head 210; a recording medium 220; an X-Y-Z stage 230; a recording/reproducing processor 241; a position recognition device 244; and a displacement controller 245.

The head 210 is provided with a support portion 211 and cantilevers 212. Specifically, the cantilevers 212 are supported on the bottom surface of the support portion 211. The support portion 211 is constructed from a substrate of a silicon compound, glass, metal, or the like. The support portion 211 is disposed above a recording surface of the recording medium 220. Incidentally, in FIG. 25, for convenience of explanation, the support portion 211 is drawn in perspective. However, the support portion 211 is usually not transparent, although it can be, depending on the selection of the material.

The cantilevers 212 are formed from high-doped silicon. Each cantilever 212 is provided with an arm and a needle. The arm has elasticity and can be bent. The base end portion of the arm is supported by the support portion 211, and the needle is disposed on the other end portion of the arm. A tip diameter of the needle is several nanometers to several tens nanometers. The total number of the cantilevers 212 is nine, and the cantilevers 212 are arranged in a matrix of 3×3 on the support portion 211. Out of the cantilevers 212, a cantilever disposed in the center of the support portion 211 is a cantilever exclusive for position recognition (hereinafter referred to as a "position recognition cantilever 212A").

Incidentally, for convenience of explanation, the total number of the cantilevers 212 is nine, but in practice, it is several tens to several hundreds. In this case, these cantilevers may include a plurality of cantilevers exclusive for position recognition.

The recording medium 220 has a square outer shape and a plate shape. The recording medium 220 is provided with: a first polymer layer 221; a second polymer layer 222; and a silicon substrate 223. The first polymer layer 221 is to record therein information. The first polymer layer 221 is formed on the second polymer layer 222 which is formed on the silicon layer 223. The material of the first polymer layer 221 is PMMA, for example. The second polymer layer 222 is to prevent abrasion at the needle tip caused by the collision of the cantilever 212 and the recording medium 220 when the needle tip of the cantilever 212 is pressed onto the recording medium 220 in recording the information. The second polymer 222 is formed between the first polymer layer 221 and the silicon substrate 223. The material of the second polymer layer 222 is closslinked photoresist, for example. The silicon substrate 223 is formed from a silicon material which is excellent in heat conduction and heat radiation or release. The silicon substrate 223 supports the first polymer layer 221 and the second polymer layer 222, and the silicon substrate 223 has a function for driving the head radiation in recording.

The recording medium 220 has a recording surface 224 to record thereon the information. Nine divisional areas 225 are formed on the recording surface 224, and the divisional areas 225 are disposed in a matrix of 3×3. Each of the divisional areas 225 corresponds to relative one of the nine cantilevers 212, and the relative one of the nine cantilevers 212 is displaced in the range of the corresponding divisional area 225. Out of the divisional areas 225, one divisional area placed in the center is an area exclusive for position recognition (hereinafter referred to as a "position recognition area 225A"). The position recognition area 225A corresponds to the position recognition cantilever 212A. Position information for recognizing a position on the recording surface 224 is formed in the position recognition area 225A. The position information will be described later.

The X-Y-Z stage 230 displaces the recording medium 220 mounted thereon, in an X direction, in a Y direction, and in a Z direction meeting at right angles to an X-Y plane.

The recording/reproducing processor 241 is provided with an operation processing circuit, a memory circuit, or the like.

The recording/reproducing processor 241 is electrically connected to the cantilevers 212 through multiplexers 242 and 243. In recording the information, the recording/reproducing processor 241 supplies, to the cantilevers 212, an electrical signal corresponding to the information to be recorded onto the recording medium 220. In reproducing the information, the recording/reproducing processor 241 receives the information (a detection signal) read by using the cantilevers 212 and performs a reproduction process of the information.

The position recognition device 244 is electrically connected to the cantilevers 212 through the multiplexers 242 and 243. The position recognition device 244 receives the position information read by using the position recognition cantilever 212A and recognizes a position on the recording surface 224. Moreover, the position recognition device 244 generates a tracking error signal on the basis of a result of the position recognition, and supplies this signal to the displacement controller 245. The specific structure and operation of the position recognition device 244 will be described later.

The displacement controller 245 is provided with an operation processing circuit, a memory circuit, or the like. The displacement controller 245 is electrically connected to the position recognition device 244, and information can be exchanged between the both. The displacement controller 245 is connected to the X-Y-Z stage 230 through actuators 246 and 247. The displacement controller 245 controls the X-Y-Z stage 230 on the basis of a seek command signal and a jump command signal or the like, which are supplied from the exterior, and displaces the recording medium 220 in an X-Y direction, to thereby displace the cantilevers 212 in the divisional areas 225 to desired positions. Moreover, the displacement controller 245 controls the X-Y-Z stage 230 on the basis of the tracking error signal supplied from the position recognition device 244, to thereby perform tracking control. Furthermore, at the start of the information record or information reproduction, the displacement controller 245 controls the X-Y-Z stage 230 to displace the recording medium 220 in the Z direction so that the needle tip of each cantilever 212 is in contact with the recording surface 224 of the recording medium 220.

An information recording operation on the recording/reproducing apparatus 200 is as follows. At first, the displacement controller 245 displaces the recording medium 220 in the X-Y direction to relatively displace the cantilevers 212 to record-start-positions. Then, the displacement controller 245 displaces the recording medium 220 in the Z direction so that the needle tip of each cantilever 212 is in contact with the recording surface 224 of the recording medium 220. At this time, the needle of the cantilever 212 is pushed by the recording surface, and a force is applied to the end portion of the arm of the cantilever 212 through the needle. Thus, the arm is slightly bent. Then, the recording/reproducing processor 241 supplies an electrical signal corresponding to the information to be recorded to the cantilevers 212. Because of the application of the electrical signal, the needle of each cantilever 212 has heat of about 400 degree C., for example, so that the first polymer layer 221 under the needle softens. Then, by the elastic force of the arm, the needle tip goes into the first polymer layer 221, to thereby form a pit (a hole or a concave portion) in the first polymer layer 221. Then, the displacement controller 245 displaces the recording medium 220 to a next record position, and the recording/reproducing processors 241 forms a pit corresponding to the information to be recorded next.

On the other hand, an information reproducing operation on the recording/reproducing apparatus 200 is as follows. At first, the displacement controller 245 displaces the recording medium 220 in the X-Y direction to displace the cantilevers 212 to read-start-positions. Then, the displacement controller 245 displaces the recording medium 220 in the Z direction so that the needle tip of each cantilever 212 is in contact with the recording surface 224 of the recording medium 220. At this time, the needle of the cantilever 212 is pushed by the recording surface, and a force is applied to the end portion of the arm of the cantilever 212 through the needle. Thus, the arm is slightly bent. Then, the displacement controller 245 displaces the recording medium 220 in the X-Y direction. At a stage after the above-recording operation is performed, the information is recorded as the pit in each divisional area 225. If the cantilever 212 is displaced onto the pit by the displacement of the recording medium 220 in the X-Y direction, the needle of the cantilever 212 goes into the pit. As a result, the extent of the bend deformation of the arm becomes mild. The change in the bend of the arm is detected by a piezoelectric element as a detection signal, and the detection signal is supplied to the recording/reproducing processor 241. Then, the recording/reproducing processor 241 extracts the information from the detection signal and reproduces it.

Figure 26:
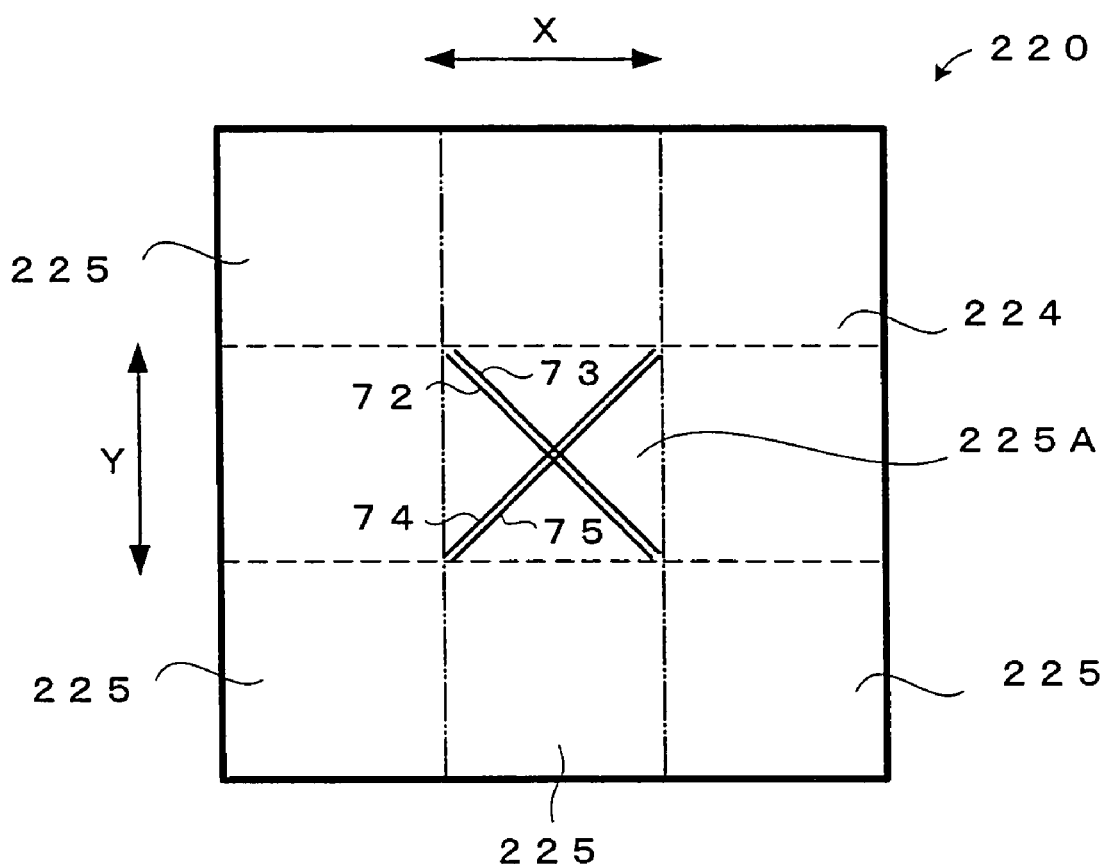
FIG. 26 is a plan view showing an example of the recording medium of the present invention.

FIG. 26 shows the recording surface 224 of the recording medium 220. As shown in FIG. 26, the position information is formed in the position recognition area 225A placed in the center of the recording surface 224. The position information is the same as the position information formed on the recording surface 71 of the recording medium 70 in FIG. 9. Namely, the position information is constructed from the first line segments 72 and 73, which are parallel to each other, and the second line segments 74 and 75, which are parallel to each other. The first line segments 72 and 73 cross the second line segments 74 and 75 at 90 degrees in the center of the position recognition area 225A. On the basis of such position information, it is possible to recognize a position on the recording surface 224 and realize the tracking control in recording and reading the information (refer to the above-described explanation about FIG. 9 and FIG. 10 or the like with respect to the principle of the position recognition or the like).

Figure 27:
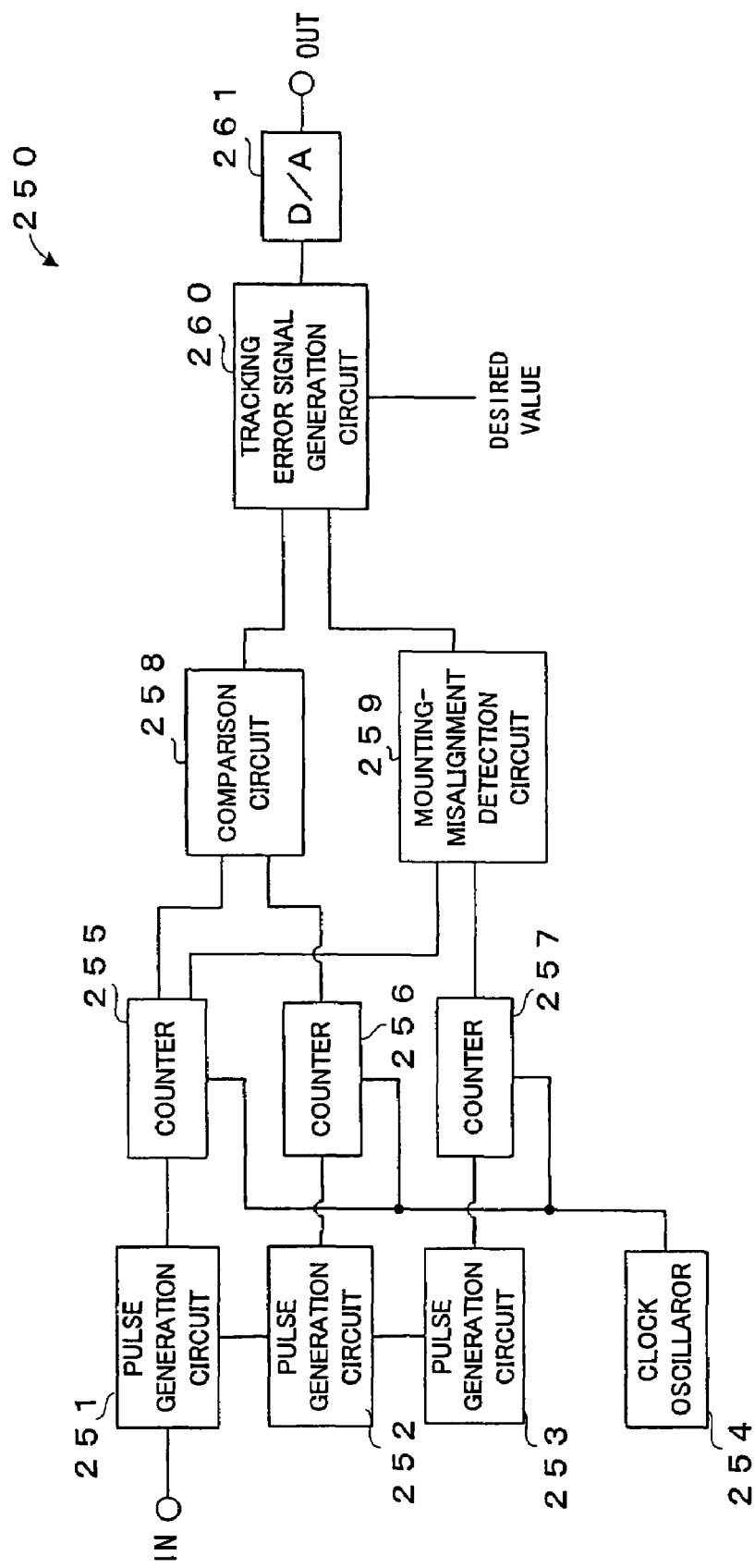
FIG. 27 is a block diagram showing a position recognition circuit provided for the position recognition apparatus of the present invention.

FIG. 27 shows a specific inner structure of the position recognition device 244. In the position recognition device 244, two pairs of position recognition circuits 250 as shown in FIG. 27 are disposed. One of the position recognition circuits 250 recognizes a position in the X axis direction on the recording surface 224 and generates a tracking error signal in the X axis direction. The other position recognition circuit 250 recognizes a position in the Y axis direction on the recording surface 224 and generates a tracking error signal in the Y axis direction.

The position recognition circuit 250 is provided with: pulse generation circuits 251, 252, and 253; a clock oscillator 254; counters 255, 256, and 257; a comparison circuit 258; a mounting-misalignment detection circuit 259; a tracking error signal generation circuit 260; and a Digital-Analog (D/A) converter 261.

The operation of the position recognition circuit 250 will be explained hereinafter. Incidentally, the explanation for the operation of the position recognition circuit 250 uses FIG. 27, FIG. 9, and FIG. 10.

As shown in FIG. 9, it is assumed that as a result of the displacement of the recording medium 220 in the X axis direction by the displacement controller 245, the needle tip of the position recognition cantilever 212A is relatively displaced from P11 to P12 on the recording surface and scans on the scan line P11 to P12. By this, a detection signal including the pulse signals S11 to S14 as shown in FIG. 10 is outputted from the position recognition cantilever 212A.

The detection signal is inputted to the pulse generation circuit 251 in FIG. 27 and subsequently supplied from the pulse generation circuit 251 to the pulse generation circuit 252, and to the pulse generation circuit 253.

The pulse generation circuit 251 extracts the pulse signals S11 and S12 from the detection signal, and supplied the pulse signals S11 and S12 to the counter 255. The counter 255 counts on the basis of a reference clock supplied from the clock oscillator 254. The counter 255 counts the number of clocks included in the pulse interval of the pulse signals S11 and S12, and outputs the count value to the comparison circuit 258 and the mounting-misalignment detection circuit 259 separately. Incidentally, the counter value corresponds to the time length t11 in FIG. 10, and further corresponds to the distance d11 between the intersection C11 and the intersection C12 in FIG. 9.

The pulse generation circuit 252 extracts the pulse signals S12 and S13 from the detection signal, and supplied the pulse signals S12 and S13 to the counter 256. As with the counter 255, the counter 256 also counts on the basis of the reference clock supplied from the clock oscillator 254. The counter 256 counts the number of clocks included in the pulse interval of the pulse signals S12 and S13, and outputs the count value to the comparison circuit 258. Incidentally, the counter value corresponds to the time length t12 in FIG. 10, and further corresponds to the distance d12 between the intersection C12 and the intersection C13 in FIG. 9.

The pulse generation circuit 253 extracts the pulse signals S13 and S14 from the detection signal, and supplied the pulse signals S13 and S14 to the counter 257. As with the counters 255 and 256, the counter 257 also counts on the basis of the reference clock supplied from the clock oscillator 254. The counter 257 counts the number of clocks included in the pulse interval of the pulse signals S13 and S14, and outputs the count value to the mounting-misalignment detection circuit 259. Incidentally, the counter value corresponds to the time length t13 in FIG. 10, and further corresponds to the distance d13 between the intersection C13 and the intersection C14 in FIG. 9.

The comparison circuit 258 compares the counter value outputted from the counter 255 with the counter value outputted from the counter 256, to thereby measure or calculate the distance d12 by a unit of the distance d11. Specifically, the counter value outputted from the counter 256 is divided by the counter value outputted from the counter 255. A value calculated in this manner indicates a position of the head 210 in the X axis direction or in the Y axis direction on the recording surface 224 (refer to the above-described principle of the position recognition). This value is outputted to the tracking error signal generation circuit 260.

The mounting-misalignment detection circuit 259 performs an operation based on the above-described formulae (1) and (2) by using the count value outputted from the counter 255 and the count value outputted from the counter 257, to thereby calculate the mounting-misalignment-angle $\theta$. A value for indicating the mounting-misalignment-angle $\theta$ is outputted to the tracking error signal generation circuit 260.

The tracking error signal generation circuit 260 generates a tracking error signal for indicating a deflection amount from a desired track position, on the basis of a desired value of the desired track position, the output of the comparison circuit 258 (the value for indicating the position of the head 210), and the output of the mounting-misalignment detection circuit 259 (the mounting-misalignment-angle $\theta$).

The D/A converter 261 samples and holds the tracking error signal outputted from the tracking error signal generation circuit 260, to thereby convert it to an analog quantity. The tracking error signal, which is converted to the analog quantity, is supplied to the displacement controller 245. Then, the tracking error signal is used for the tracking control by the displacement controller 245.

Incidentally, in the above-described example, the position information is read by the position recognition cantilever 212A. However, the present invention is not limited to this example. For example, a reading device for reading the position information may be constructed to be not only the cantilever, but also a reading device which uses magnetism, or a reading device which uses light.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 2003-311881 filed on Sep. 3, 2003 including the specification, claims, drawings and summary is incorporated herein by reference in its entirety.

What is claimed is:

1. A recording medium used for an information recording or reading apparatus, comprising:
    a rectangular information recording area on a surface of said recording medium to record therein information; and
    position information, which is formed in said information recording area, for recognizing a position in said information recording area,
    said position information including:
    at least two first line segments, which are parallel to each other, formed by physical features which are different from those of other parts of said information recording area; and
    at least one second line segment formed by physical features which are different from those of other parts of said information recording area,
    the first line segments and the second line segment being disposed such that at least one of the first line segments or an extension line of at least one of the first line segments crosses the second line segment or an extension line of the second line segment,
    wherein neither the first line segments nor the second line segment is parallel to either of two edges, which are adjacent to each other, of said information recording area.

2. The recording medium according to claim 1, wherein the first line segments are adjacent to each other.

3. The recording medium according to claim 1, wherein the second line segment is at 45 degrees to a prearranged scan line to record or read the information with respect to said recording medium surface.

4. The recording medium according to claim 1, wherein
    a plurality of pairs of the first line segments are formed in said information recording area, and
    the plurality of pairs of the first line segments and the second line segment are disposed such that an arbitrary straight line parallel to a prearranged scan direction for recording or reading the information with respect to said recording medium surface crosses any one of the plurality of pairs of the first line segments and the second line segment in any place except intersections of the first line segments and the second line segment.

5. The recording medium according to claim 1, wherein
a plurality of pairs of the second line segments are formed in said information recording area, and
the first line segments and the plurality of pairs of the second line segments are disposed such that an arbitrary straight line parallel to a prearranged scan direction for recording or reading the information with respect to said recording medium surface crosses any one of the plurality of pairs of the second line segments and the first line segments in any place except intersections of the first line segments and the second line segments.

6. The recording medium according to claim 1, wherein the second line segment is formed not to cross the first line segments, in the condition that the first line segments cross an extension line of the second line segment, or an extension line of each of the first line segments crosses the second line segment or an extension line of the second line segment.

7. The recording medium according to claim 1, wherein one or more third line segments, which are parallel to the first line segments or the second line segment, are formed by physical features which are different from those of other parts of said information recording area.

8. The recording medium according to claim 1, wherein widths of the first line segments or the second line segment change according to a predetermined rule.

9. The recording medium according to claim 1, wherein widths of the first line segments or the second line segment are different for each line segment.

10. The recording medium according to claim 1, wherein said information recording area has a position recognition area in one portion thereof, and the first line segments and the second line segment are formed only in the position recognition area.

11. The recording medium according to claim 10, wherein said information recording area has a plurality of position recognition areas.

12. A recording medium used for an information recording or reading apparatus, comprising:
a rectangular information recording area on a medium surface of said recording medium to record therein information; and
position information, which is formed in said information recording area, for recognizing a position in said information recording area,
said position information including:
at least two first line segments, which are parallel to each other, formed by physical features which are different from those of other parts of said information recording area; and
at least two second line segments, which are parallel to each other, formed by giving physical features which are different from those of other parts of said information recording area,
the first line segments and the second line segments being disposed such that at least one of the first line segments or an extension line of at least one of the first line segments crosses at least one of the second line segments or an extension line of at least one of the second line segment,
wherein neither the first line segments nor the second line segments are parallel to either of two edges, which are adjacent to each other, of said information recording area.

13. The recording medium according to claim 12, wherein the first line segments are adjacent to each other and the second line segments are adjacent to each other.

14. The recording medium according to claim 12, wherein the first line segments are at +45 degrees to a prearranged scan line for recording or reading the information with respect to said recording medium surface, and the second line segments are at −45 degrees to the prearranged scan line.

15. The recording medium according to claim 12, wherein a plurality of pairs of the first line segments are formed in said information recording area, and
the plurality of pairs of the first line segments and the second line segments are disposed such that an arbitrary straight line parallel to a prearranged scan direction for recording or reading the information with respect to said recording medium surface crosses any one of the plurality of pairs of the first line segments and the second line segments in any place except intersections of the first line segments and the second line segments.

16. The recording medium according to claim 12, wherein a plurality of pairs of the second line segments are formed in said information recording area, and
the first line segments and the plurality of pairs of the second line segments are disposed such that an arbitrary straight line parallel to a prearranged scan direction for recording or reading the information with respect to said recording medium surface crosses any one of the plurality of pairs of the second line segments and the first line segments in any place except intersections of the first line segments and the second line segments.

17. The recording medium according to claim 12, wherein the second line segments are formed not to cross the first line segments, in the condition that the first line segments cross extension lines of the second line segments, or an extension line of each of the first line segments crosses the second line segments or extension lines of the second line segments.

18. The recording medium according to claim 12, wherein one or more third line segments, which are parallel to the first line segments or the second line segments, are formed by physical features which are different from those of other parts of said information recording area.

19. The recording medium according to claim 12, wherein widths of the first line segments or the second line segments change according to a predetermined rule.

20. The recording medium according to claim 12, wherein widths of the first line segments or the second line segments are different for each line segment.

21. The recording medium according to claim 12, wherein said information recording area has a position recognition area in one portion thereof, and the first line segments and the second line segments are formed only in the position recognition area.

22. The recording medium according to claim 21, wherein said information recording area has a plurality of position recognition areas.

23. A position recognition apparatus for recognizing a position on a recording surface of a recording medium comprising: at least two first line segments, which are parallel to each other, formed by physical features which are different from those of other parts of said recording surface; and at least one second line segment formed by physical features which are different from those of other parts of said recording surface, the first line segments and the second line segment being disposed such that at least one of the first line segments or an extension line of at least one of the first line segments crosses the second line segment or an extension line of the second line segment,
said position recognition apparatus comprising:
a detecting device for scanning on a scan line, which crosses the first line segments and the second line segment, to thereby detect an intersection of one of the first line segments and the scan line, an intersection of another of the first line segments and the scan line, and an intersection of the second line segment and the scan line;

a first distance recognition device for recognizing a distance between (i) the intersection of the one of the first line segments and the scan line and (ii) the intersection of the other of the first line segments and the scan line, on the basis of a detection result of said detecting device;

a second distance recognition device for recognizing a distance between (i) the intersection of the one or the other of the first line segments and the scan line and (ii) the intersection of the second line segment and the scan line, on the basis of the detection result of said detecting device; and a comparing device for comparing the distance recognized by said first distance recognition device with the distance recognized by said second distance recognition device.

24. A position recognition apparatus for recognizing a position on a recording surface of a recording medium comprising: at least two first line segments, which are parallel to each other, formed by physical features which are different from those of other parts of said recording surface; and at least two second line segments, which are parallel to each other, formed by physical features which are different from those of other parts of said recording surface, the first line segments and the second line segments being disposed such that at least one of the first line segments or an extension line of at least one of the first line segments crosses at least one of the second line segments or an extension line of at least one of the second line segments, said position recognition apparatus comprising:

a detecting device for scanning on a scan line which crosses the first line segments and the second line segments, to thereby detect an intersection of one of the first line segments and the scan line, an intersection of another of the first line segments and the scan line, an intersection of one of the second line segments and the scan line, and an intersection of another of the second line segments and the scan line;

a first distance recognition device for recognizing a distance between (i) the intersection of the one of the first line segments and the scan line and (ii) the intersection of the other of the first line segments and the scan line, on the basis of a detection result of said detecting device;

a second distance recognition device for recognizing a distance between (i) the intersection of one of the second line segments and the scan line and (ii) the intersection of the other of the second line segments and the scan line, on the basis of the detection result of said detecting device;

a third distance recognition device for recognizing a distance between (i) the intersection of the one or the other of the first line segments and the scan line and (ii) the intersection of the one or the other of the second line segments and the scan line, on the basis of the detection result of said detecting device; and a comparison-operating device for performing a comparison operation by using the distance recognized by said first distance recognition device, the distance recognized by said second distance recognition device, and the distance recognized by said third distance recognition device.

25. A position recognition method of recognizing a position on a recording surface of a recording medium comprising: at least two first line segments, which are parallel to each other, formed by physical features which are different from those of other parts of said recording surface, and at least one second line segment formed by physical features which are different from those of other parts of said recording surface, the first line segments and the second line segment being disposed such that at least one of the first line segments or an extension line of at least one of the first line segments crosses the second line segment or an extension tine of the second line segment, said position recognition method comprising:

a detecting process of scanning on a scan line, which crosses the first line segments and the second line segment, to thereby detect an intersection of one of the first line segments and the scan line, an intersection of another of the first line segments and the scan line, and an intersection of the second line segment and the scan line;

a first distance recognition process of recognizing a distance between (i) the intersection of the one of the first line segments and the scan line and (ii) the intersection of the other of the first line segments and the scan line, on the basis of a detection result of said detecting process;

a second distance recognition process of recognizing a distance between (i) the intersection of the one or the other of the first line segments and the scan line and (ii) the intersection of the second line segment and the scan line, on the basis of the detection result of said detecting process; and a comparing process of comparing the distance recognized by said first distance recognition process with the distance recognized by said second distance recognition process.

26. A position recognition method of recognizing a position on a recording surface of a recording medium comprising: at least two first line segments, which are parallel to each other, formed by physical features which are different from those of other parts of said recording surface; and at least two second line segments, which are parallel to each other, formed by physical features which are different from those of other parts of said recording surface, the first line segments and the second line segments being disposed such that at least one of the first line segments or an extension line of at least one of the first line segments crosses at least one of the second line segments or an extension line of at least one of the second line segments, said position recognition method comprising:

a detecting process of scanning on a scan line, which crosses the first line segments and the second line segments, to thereby detect an intersection of one of the first line segments and the scan line, an intersection of another of the first line segments and the scan line, an intersection of one of the second line segments and the scan line, and an intersection of another of the second line segments and the scan line;

a first distance recognition process of recognizing a distance between (i) the intersection of the one of the first line segments and the scan line and (ii) the intersection of the other of the first line segments and the scan line, on the basis of a detection result of said detecting process;

a second distance recognition process of recognizing a distance between (i) the intersection of the one of the second line segments and the scan line and (ii) the intersection of the other of the second line segments and the scan line, on the basis of the detection result of said detecting process;

a third distance recognition process of recognizing a distance between (i) the intersection of the one or the other of the first line segments and the scan line and (ii) the intersection of the one or the other of the second line segments and the scan line, on the basis of the detection result of said detecting process; and a comparison-operating process of performing a comparison operation by using the distance recognized by said first distance recognition process, the distance recognized by said second distance recognition process, and the distance recognized by said third distance recognition process.

* * * * *